US012647772B2

(12) United States Patent
Hong et al.

(10) Patent No.: US 12,647,772 B2
(45) Date of Patent: Jun. 2, 2026

(54) ELECTRONIC DEVICE SUPPORTING PLURALITY OF SIMS AND METHOD FOR OPERATING SAME

(71) Applicant: Samsung Electronics Co., Ltd., Suwon-si (KR)

(72) Inventors: Byungho Hong, Suwon-si (KR); Yoseob Kwak, Suwon-si (KR); Jungmin Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 18/452,184

(22) Filed: Aug. 18, 2023

(65) Prior Publication Data

US 2023/0396982 A1 Dec. 7, 2023

Related U.S. Application Data

(63) Continuation of application No. PCT/KR2021/019963, filed on Dec. 27, 2021.

(30) Foreign Application Priority Data

Feb. 19, 2021 (KR) ........................ 10-2021-0022496

(51) Int. Cl.
H04W 8/18 (2009.01)
H04W 8/22 (2009.01)
H04W 76/10 (2018.01)

(52) U.S. Cl.
CPC ............. *H04W 8/183* (2013.01); *H04W 8/22* (2013.01); *H04W 76/10* (2018.02)

(58) Field of Classification Search
CPC ......... H04W 8/183; H04W 8/18; H04W 8/22; H04W 76/10
See application file for complete search history.

(56) References Cited

U.S. PATENT DOCUMENTS 10,701,548 B1 * 6/2020 Sevindik ............... H04W 24/08
10,708,836 B1 7/2020 Buyukdura et al.
(Continued)

FOREIGN PATENT DOCUMENTS

KR 10-2010-0131299 A 12/2010
KR 10-2014-0080099 A 6/2014
(Continued)

OTHER PUBLICATIONS

International Search Report with Written Opinion and English translation dated Apr. 6, 2022; International Appln. No. PCT/KR2021/019963.

*Primary Examiner* — Tuan H Nguyen
(74) *Attorney, Agent, or Firm* — Jefferson IP Law, LLP

(57) ABSTRACT

An electronic device is provided. The electronic device includes at least one processor connected to a first subscriber identity module (SIM) and a second SIM, and a memory that stores first information associated with a first quality of service (QoS) flow corresponding to the first SIM and second information associated with a second QoS flow corresponding to the second SIM, wherein the at least one processor is configured to identify characteristics of an application being executed by the electronic device, compare at least a portion of the first information and at least a portion of the second information, which are identified on the basis of the characteristics of the application, on the basis of the comparison result, select a SIM for transmitting/receiving data of the application from among the first SIM and the second SIM, and transmit a protocol data unit (PDU) session establishment request message for the application.

22 Claims, 20 Drawing Sheets

(56)  References Cited

U.S. PATENT DOCUMENTS

| 2012/0135715 | A1 | 5/2012 | Kang et al. |
| 2014/0179373 | A1 | 6/2014 | Hur et al. |
| 2017/0134298 | A1 | 5/2017 | Walke |
| 2019/0053308 | A1 | 2/2019 | Castellanos Zamora et al. |
| 2019/0356743 | A1* | 11/2019 | Park ........................ H04W 4/70 |
| 2019/0357230 | A1 | 11/2019 | Johnson et al. |
| 2020/0163154 | A1 | 5/2020 | Park et al. |
| 2020/0260330 | A1 | 8/2020 | Zhu et al. |
| 2020/0280878 | A1 | 9/2020 | Chaponniere et al. |
| 2020/0336430 | A1 | 10/2020 | Kim et al. |
| 2020/0359440 | A1 | 11/2020 | Qiao et al. |
| 2022/0240222 | A1 | 7/2022 | Youn |

FOREIGN PATENT DOCUMENTS

| KR | 10-2018-0080226 | A | 7/2018 |
| KR | 10-2019-0132018 | A | 11/2019 |
| KR | 10-2020-0059768 | A | 5/2020 |
| KR | 10-2020-0122845 | A | 10/2020 |
| WO | 2021/015598 | A1 | 1/2021 |

* cited by examiner

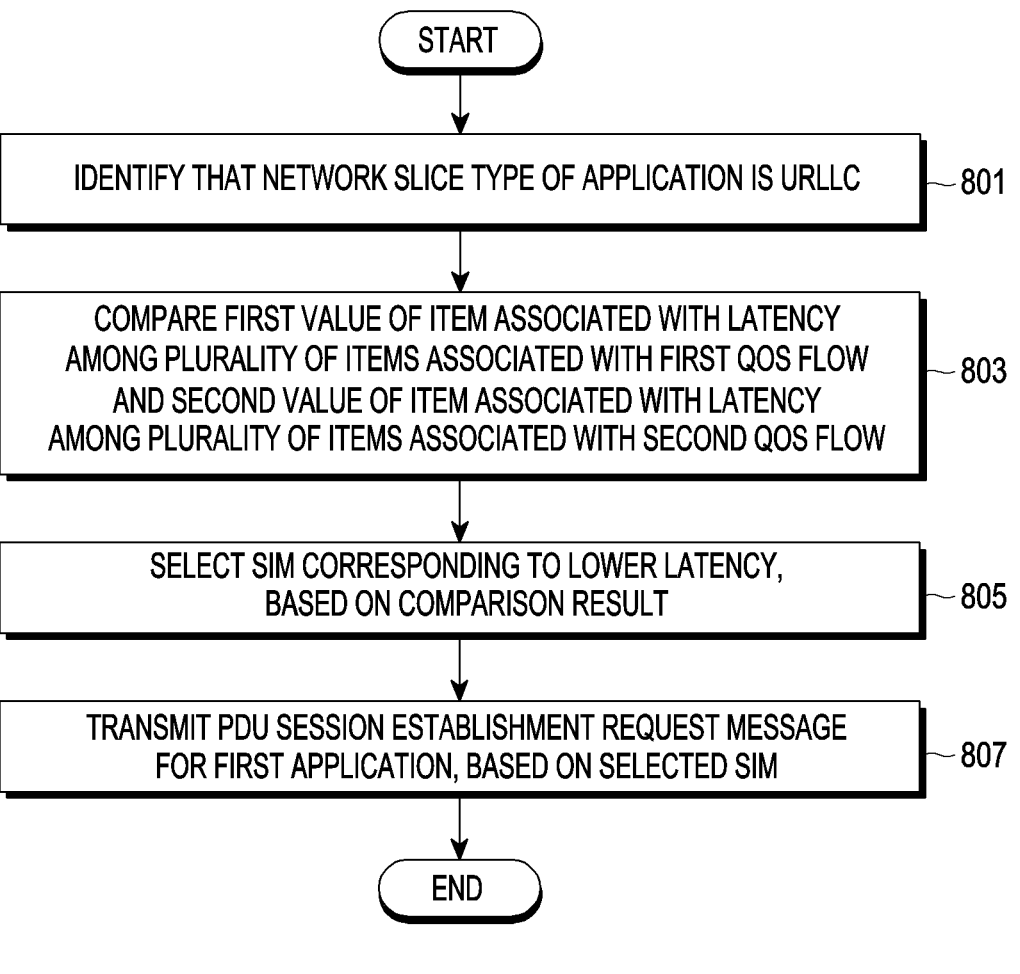

START

IDENTIFY THAT NETWORK SLICE TYPE OF APPLICATION IS URLLC — 801

COMPARE FIRST VALUE OF ITEM ASSOCIATED WITH LATENCY
AMONG PLURALITY OF ITEMS ASSOCIATED WITH FIRST QOS FLOW
AND SECOND VALUE OF ITEM ASSOCIATED WITH LATENCY
AMONG PLURALITY OF ITEMS ASSOCIATED WITH SECOND QOS FLOW — 803

SELECT SIM CORRESPONDING TO LOWER LATENCY,
BASED ON COMPARISON RESULT — 805

TRANSMIT PDU SESSION ESTABLISHMENT REQUEST MESSAGE
FOR FIRST APPLICATION, BASED ON SELECTED SIM — 807

END

FIG. 8

START

EXECUTE FIRST APPLICATION ~1701

SELECT SIM HAVING URSP RULE
CORRESPONDING TO FIRST APPLICATION ~1703

TRANSMIT PDU SESSION ESTABLISHMENT
REQUEST MESSAGE, BASED ON SELECTED SIM ~1705

END

ELECTRONIC DEVICE SUPPORTING PLURALITY OF SIMS AND METHOD FOR OPERATING SAME

CROSS-REFERENCE TO RELATED APPLICATION(S)

This application is a continuation application, claiming priority under § 365(c), of an International application No. PCT/KR2021/019963, filed on Dec. 27, 2021, which is based on and claims the benefit of a Korean patent application number 10-2021-0022496, filed on Feb. 19, 2021, in the Korean Intellectual Property Office, the disclosure of which is incorporated by reference herein in its entirety.

BACKGROUND

1. Field

The disclosure relates to an electronic device supporting a plurality of subscriber identity modules (SIMs) and a method of operating the same.

2. Description of Related Art

In a wireless communication system, an electronic device (for example, a user equipment (UE)) may access a wireless communication network to use a voice communication or data communication service at a predetermined location or during movement. In order to provide the communication service to the electronic device, an appropriate authentication process is needed. In general, a universal integrated circuit card (UICC) is inserted into the electronic device, and authentication is performed between servers of the electronic device and a mobile network operator (MNO) through a universal subscriber identity module (USIM) installed in the UICC. The UICC may be called a subscriber identity module (SIM) card in a global system for mobile communications (GSM) scheme, and may be called a universal subscriber identity module (USIM) card in a wideband code division multiple access (WCDMA), long-term evolution (LTE), or new radio (NR) scheme.

When a user of the electronic device subscribes to the wireless communication service provided by the MNO, the MNO may provide the UICC (for example, the SIM card or the USIM card) to the user and the user may insert the provided UICC into the electronic device. When the UICC is inserted into the electronic device, a USIM application installed in the UICC may be executed, and an appropriate authentication process using an international mobile subscriber identity (IMSI) value and an encryption key for authentication stored in the UICC may be performed with a server of the MNO storing the same values. After the appropriate authentication process, the wireless communication service may be used.

The electronic device may support two or more SIMs, and the electronic device may be named a dual SIM electronic device when two SIMs are supported and named a multi-SIM electronic device when a plurality of SIMs are supported. The dual SIM or multi-SIM electronic device may support a plurality of SIMs, and respective SIMs may be associated with different subscriptions. Each signal associated with each of the plurality of SIMs may be transmitted and received to and from a network by the electronic device. A mode in which the signals associated with the plurality of SIMs cannot be substantially transmitted and received at the same time may be referred to as a dual SIM dual standby (DSDS) mode. In the DSDS mode, during transmission or reception of a signal based on one SIM, a signal based on another SIM cannot be transmitted and received, and accordingly, the other SIM may be in a standby mode.

The above information is presented as background information only to assist with an understanding of the disclosure. No determination has been made, and no assertion is made, as to whether any of the above might be applicable as prior art with regard to the disclosure.

SUMMARY

An electronic device supporting multiple SIMs may acquire and/or store a plurality of UE route selection policy (URSP) rules corresponding to receptive multiple SIMs. When a specific application is executed or when a network connection request is identified from the specific application, the electronic device may establish a protocol data unit (PDU) session connection on the basis of a URSP rule corresponding to the currently used SIM or connect the existing PDU session to the specific application. Meanwhile, every network operator may provide different quality of service (QoS). However, a configuration for selecting a SIM which can provide the best QoS from among a plurality of SIMs to establish a PDU session connection corresponding to the specific application has never been disclosed.

Aspects of the disclosure are to address at least the above-mentioned problems and/or disadvantages and to provide at least the advantages described below. Accordingly, an aspect of the disclosure is to provide an electronic device and a method of operation the same that select a SIM which can provide the best QoS for the specific application when the specific application is executed.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor, and a memory, wherein the at least one processor is configured to control to store, in the memory, first information associated with a first QoS flow corresponding to a first SIM connected to the at least one processor, control to store, in the memory, second information associated with a second QoS flow corresponding to a second SIM connected to the at least one processor, identify a characteristic of an application executed by the electronic device, compare at least a portion of the first information and at least a portion of the second information, at least the portion of the first information and at least the portion of the second information being identified, based on the characteristic of the application, select a SIM for transmitting and/or receiving data of the application from among the first SIM and the second SIM, based on a result of the comparison, and transmit a PDU session establishment request message for the application, based on the selected SIM.

In accordance with another aspect of the disclosure, a method of operating an electronic device is provided. The method includes controlling to store, in a memory of the electronic device, first information associated with a first QoS flow corresponding to a first SIM connected to the electronic device, controlling to store, in the memory, second information associated with a second QoS flow corresponding to a second SIM connected to the electronic device, identifying a characteristic of an application executed by the electronic device, comparing at least a portion of the first information and at least a portion of the second information, at least the portion of the first information and at least the portion of the second information being identified, based on the characteristic of the application, selecting a SIM for transmitting and/or receiving data of the application from among the first SIM and the second SIM, based on a result of the comparison, and transmitting a PDU session establishment request message for the application, based on the selected SIM.

According to various embodiments, an electronic device and a method of operation the same capable of selecting a SIM which can provide the best QoS for a specific application when the specific application is executed can be provided. According to selection of the SIM which can provide the best QoS among a plurality of SIMs, an optimized service for each application can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a flowchart illustrating a method of operating the electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
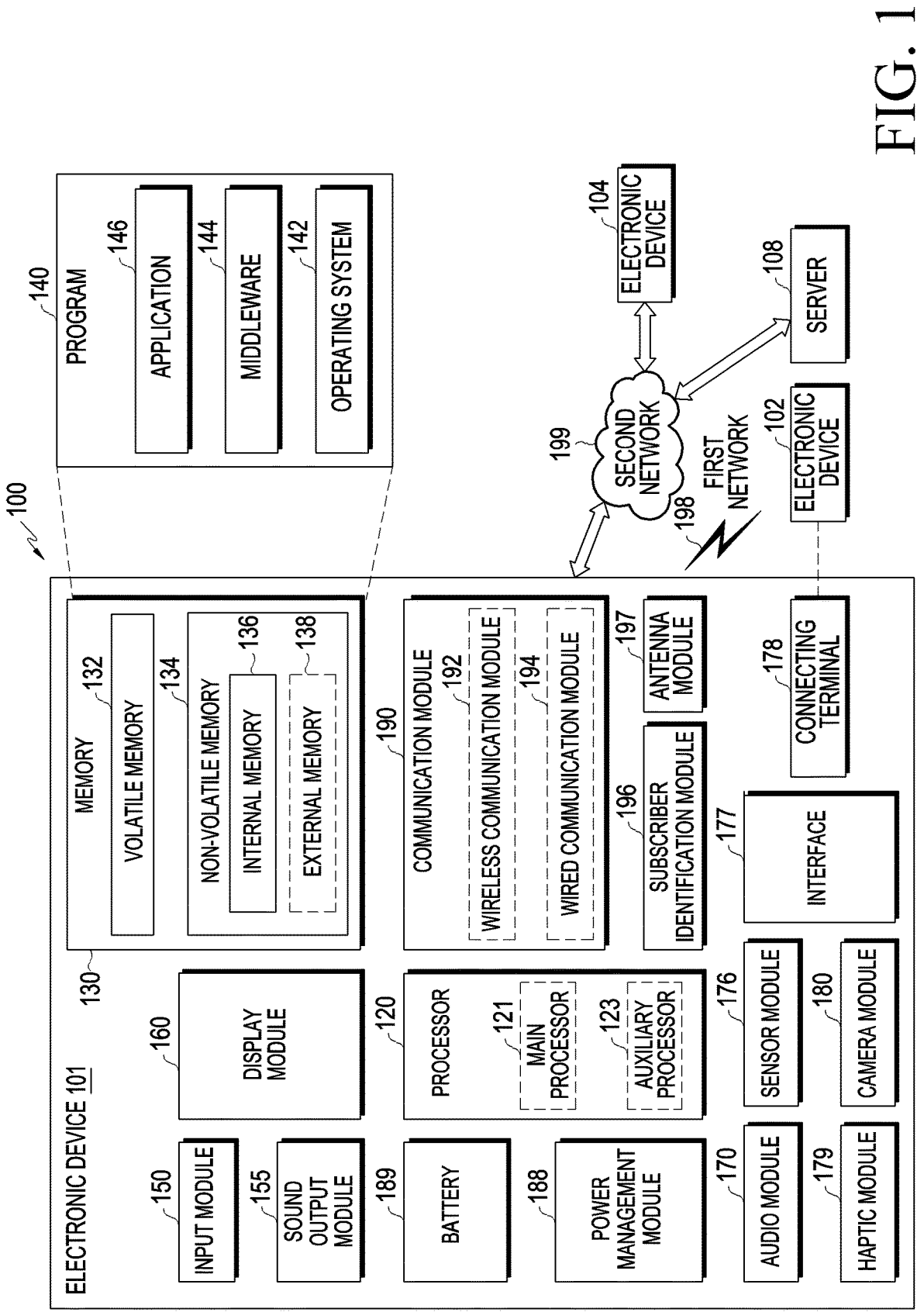
FIG. 1 is a block diagram illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to another embodiment, the electronic device 101 may communicate with the electronic device 104 via the server 108. According to yet another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to a further embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to still another embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to a further embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to still another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to another embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to yet another embodiment, the haptic module 179 may include, for example, a motor, a piezoelectric element, or an electric stimulator.

The camera module 180 may capture a still image or moving images. According to a further embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to a further embodiment, the antenna module 197 may include an antenna including a radiating element composed of a conductive material or a conductive pattern formed in or on a substrate (e.g., a printed circuit board (PCB)). According to still another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to another embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to a further embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to still another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
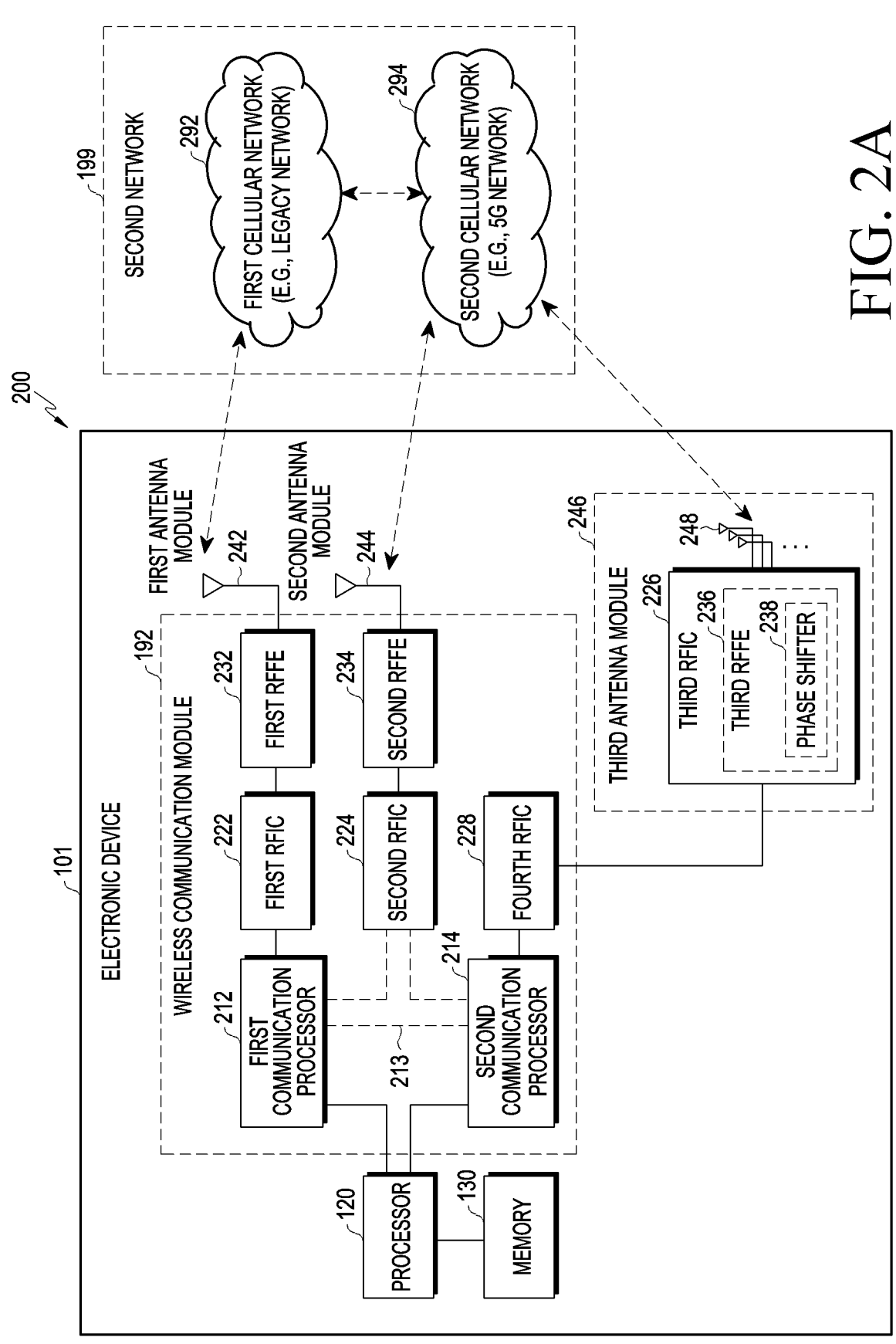
FIG. 2A is a block diagram of an electronic device for supporting legacy network communication and fifth generation (5G) network communication according to an embodiment of the disclosure.
Figure 2B:
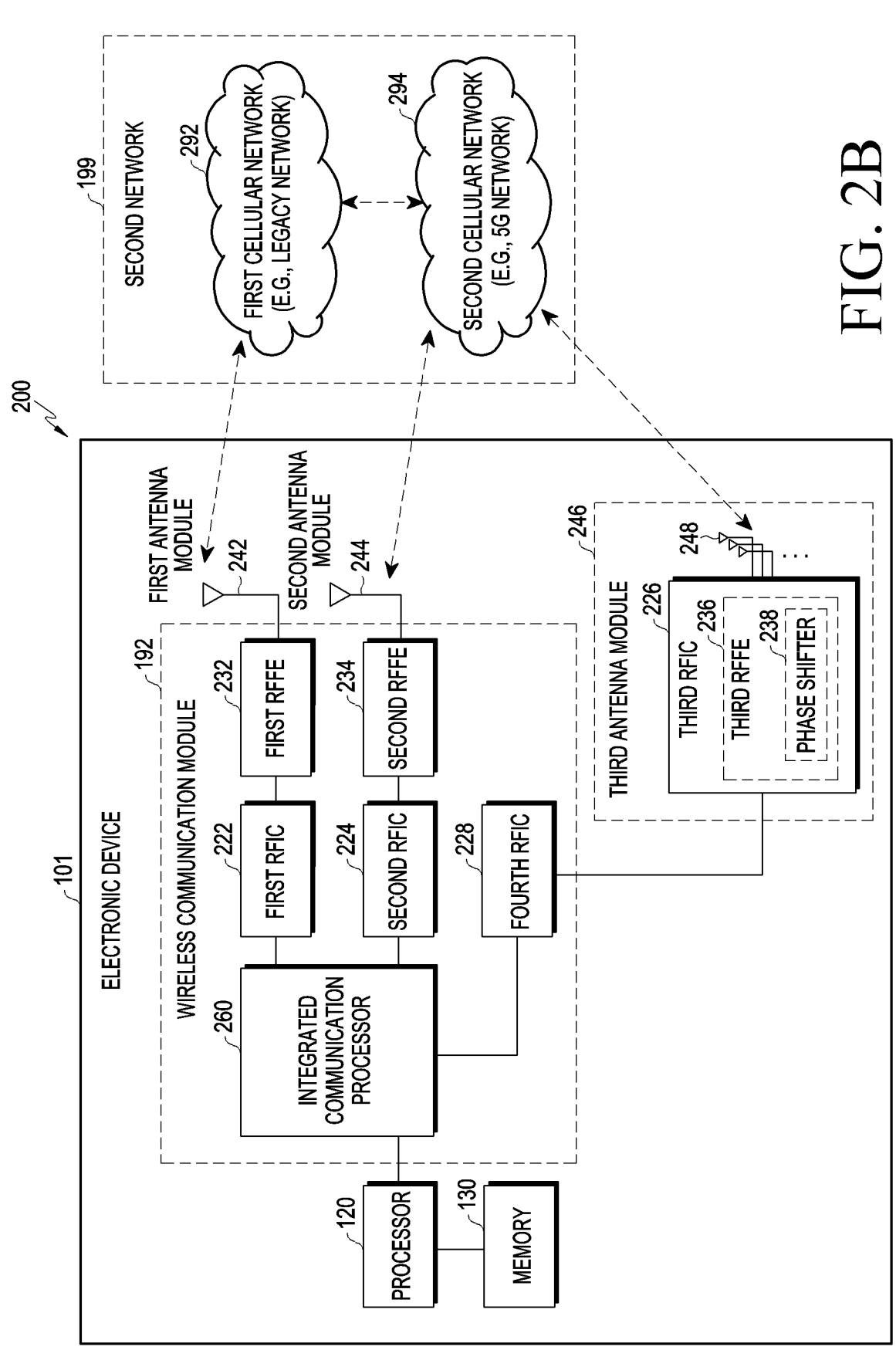
FIG. 2B is a block diagram of the electronic device for supporting legacy network communication and 5G network communication according to an embodiment of the disclosure.

FIG. 2A is a block diagram 200 of the electronic device 101 for supporting legacy network communication and 5G network communication according to an embodiment of the disclosure. FIG. 2B is a block diagram of the electronic device for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include the processor 120 and the memory 130. A second network 199 may include a first cellular network 292 and a second cellular network 294. According to another embodiment, the electronic device 101 may further include at least one of the elements illustrated in FIG. 1, and the second network 199 may further include at least one other network. According to another embodiment, the first communication processor 212, the second communication processor 214, the first RFIC 222, the second RFIC 224, the fourth RFIC 228, the first RFFE 232, and the second RFFE 234 may configure at least a portion of the wireless communication module 192. According to another embodiment, the fourth RFIC 228 may be omitted or may be included as a part of the third RFIC 226.

The first communication processor 212 may support establishment of a communication channel in a band to be used for wireless communication with the first cellular network 292 and legacy network communication through the established communication channel. According to various embodiments, the first cellular network may be a legacy network including a second generation (2G), third generation (3G), 4G, or long term evolution (LTE) network. The second communication processor 214 may support establishment of a communication channel corresponding to a predetermined band (for example, about 6 gigahertz (GHz) to about 60 GHz) among bands to be used for wireless communication with the second cellular network 294 and 5G network communication through the established communication channel. According to various embodiments, the second cellular network 294 may be a 5G network defined in the 3rd generation partnership project (3GPP). In addition, according to yet another embodiment, the first communication processor 212 or the second communication processor 214 may support establishment of a communication channel corresponding to another predetermined band (for example, equal to or lower than about 6 GHz) among bands to be used for wireless communication with the second cellular network 294 and 5G network communication through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an inter-processor interface 213 between processors. The inter-processor interface 213 may be implemented as, for example, a universal asynchronous receiver/transmitter (UART) (for example, a high speed-UART (HS-UART) or a peripheral component interconnect bus express (PCIe) interface), but there is no limitation therein. Alternatively, the first communication processor 212 and the second communication processor 214 may exchange control information and packet data information through, for example, a shared memory. The first communication processor 212 may transmit and receive various pieces of information such as sensing information, information on an output intensity, and resource block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor). For example, the first communication processor 212 and the second communication processor 214 may transmit and receive data to and from the processor 120 (for example, an application processor) through an HS-UART interface or a PCIe interface, but there is no limitation on the type thereof. Alternatively, the first communication processor 212 and the second communication processor 214 may exchange control information and packet data information with the processor 120 (for example, an application processor) through a shared memory.

According to a further embodiment, the first communication processor 212 and the second communication processor 214 may be implemented within a single chip or a single package. According to various embodiments, the first communication processor 212 or the second communication processor 214 may be configured with the processor 120, the auxiliary processor 123, or the communication module 190 within a single chip or a single package. For example, as illustrated in FIG. 2B, an integrated communication processor 260 may support all functions for communication with the first cellular network 292 and the second cellular network 294.

In transmission, the first RFIC 222 may convert a baseband signal generated by the first communication processor 212 into a radio frequency (RF) signal of about 700 megahertz (MHz) to about 3 GHz used for the first cellular network 292 (for example, legacy network). In reception, the RF signal may be acquired from the first cellular network 292 (for example, legacy network) through an antenna (for example, the first antenna module 242) and may be prepro-cessed through the RFFE (for example, first RFFE 232). The first RFIC 222 may convert the preprocessed RF signal into a baseband signal to be processed by the first communica-tion processor 212.

In transmission, the second RFIC 224 may convert a baseband signal generated by the first communication pro-cessor 212 or the second communication processor 214 into an RF signal (hereinafter, referred to as a 5G Sub6 RF signal) in a Sub6 band (for example, equal to or lower than about 6 GHz) used in the second cellular network 294 (for example, 5G network). In reception, a 5G Sub6 RF signal may be acquired from the second cellular network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal to be processed by the corre-sponding communication processor among the first commu-nication processor 212 or the second communication pro-cessor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) used by the second cellular network 294 (for example, 5G network). In reception, a 5G Above6 RF signal may be acquired from the second cellular network 294 (for example, 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to still another embodiment, the third RFFE 236 may be configured as a part of the third RFIC 226.

The electronic device 101 may include the fourth RFIC 228 separately from the third RFIC 226 or as a part thereof according to an embodiment. In this case, after converting a baseband signal generated by the second communication processor 214 into an RF signal (hereinafter, referred to as an IF signal) in an intermediate frequency band (for example, about 9 GHz to about 11 GHz), the fourth RFIC 228 may transmit the IF signal to the third RFIC 226. The third RFIC 226 may convert the IF signal into a 5G Above6 RF signal. In reception, a 5G Above6 RF signal may be received from the second cellular network 294 (for example, 5G network) through an antenna (for example, antenna 248) and converted into an IF signal by the third RFIC 226. The fourth RFIC 228 may convert the IF signal into a baseband signal to be processed by the second communication pro-cessor 214.

According to another embodiment, the first RFIC 222 and the second RFIC 224 may be implemented as at least a portion of a single chip or a single package. According to various embodiments, when the first RFIC 222 and the second RFIC 224 are implemented as a single chip or a single package in FIG. 2A or 2B, they may be implemented as an integrated RFIC. In this case, the integrated RFIC may be connected to the first RFFE 232 and the second RFFE 234 to convert a baseband signal into a signal in a band sup-ported by the first RFFE 232 and/or the second RFFE 234, and may transmit the converted signal to one of the first RFFE 232 and the second RFFE 234. According to yet another embodiment, the first RFFE 232 and the second RFFE 234 may be implemented as at least a portion of a single chip or a single package. According to a further embodiment, at least one of the first antenna module 242 or the second antenna module 244 may be omitted or may be connected to another antenna module to process RF signals in a plurality of corresponding bands.

According to still another embodiment, the third RFIC 226 and the antenna 248 may be disposed on the same substrate to configure the third antenna module 246. For example, the wireless communication module 192 or the processor 120 may be disposed on a first substrate (for example, main PCB). In this case, the third RFIC 226 may be disposed in a partial area (for example, bottom side) of a second substrate (for example, sub PCB) separated from the first substrate and the antennas 248 may be disposed in another partial area (for example, top side) to configure the third antenna module 246. By disposing the third RFIC 226 and the antennas 248 on the same substrate, it is possible to reduce the length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may improve the quality or speed of communi-cation with the second cellular network 294 (for example, the 5G network).

According to an embodiment, the antennas 248 may be configured as an antenna array including a plurality of antennal elements which can be used for beamforming. In this case, the third RFIC 226 may include, for example, a plurality of phase shifters 238 corresponding to the plurality of antenna elements as a part of the third RFFE 236. In transmission, each of the plurality of phase shifters 238 may convert a phase of a 5G Above6 RF signal to be transmitted to the outside of the electronic device 101 (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

The second cellular network 294 (for example, 5G net-work) may operate independently from the first cellular network 292 (for example, legacy network) (for example, standalone (SA)) or operate through a connection to thereto (for example, non-standalone (NSA)). For example, in the 5G network, only an access network (for example, a 5G radio access network (RAN) or a next generation RAN (NG RAN)) may exist without a core network (for example, a next generation core (NGC)). In this case, the electronic device 101 may access the access network of the 5G network and then access an external network (for example, Internet) under the control of the core network (for example, evolved packed core (EPC) of the legacy network. Protocol infor-mation (for example, LTE protocol information) for com-munication with the legacy network and protocol informa-tion (for example, new radio (NR) protocol information) for communication with the 5G network may be stored in the memory 230 and may be accessed by another element (for example, the processor 120, the first communication pro-cessor 212, or the second communication processor 214).

Figure 3A:
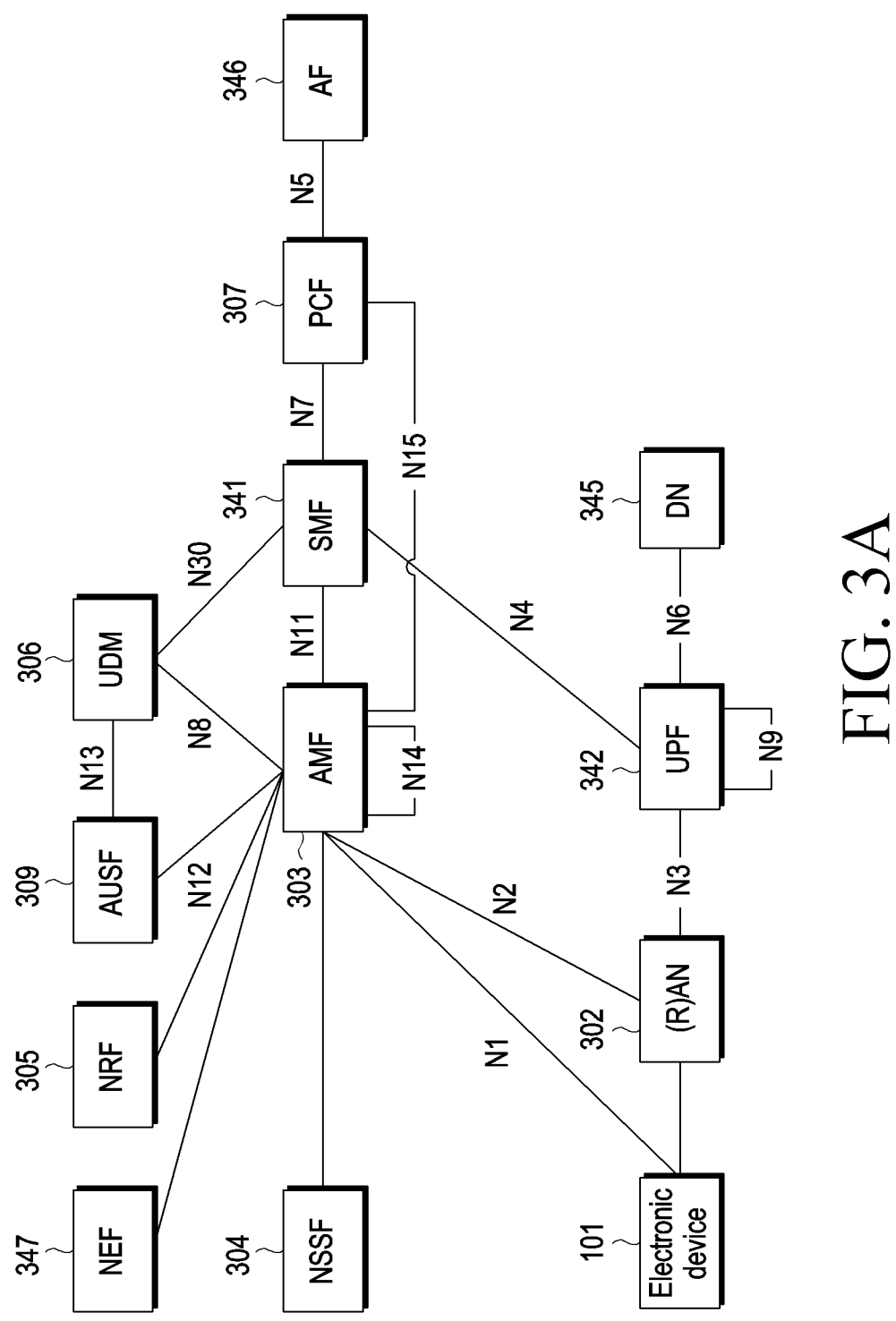
FIG. 3A illustrates the 5G system structure according to an embodiment of the disclosure.
Figure 3B:
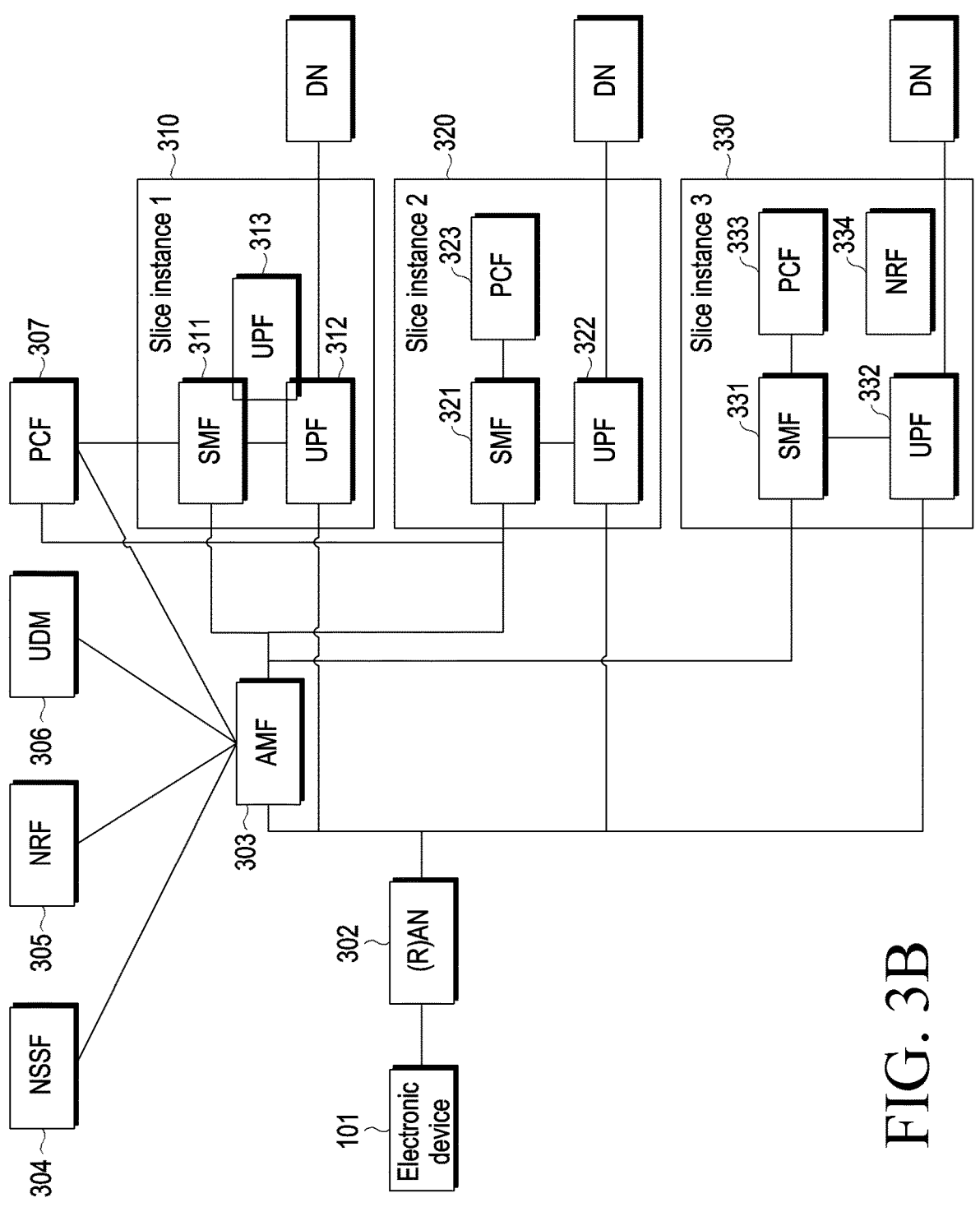
FIG. 3B illustrates the 5G network slice structure according to an embodiment of the disclosure.

FIG. 3A illustrates the 5G system structure according to an embodiment of the disclosure. FIG. 3B illustrates the 5G network slice structure according to an embodiment of the disclosure. Hereinafter, the overall 5G system and the network slice are described with reference to FIGS. 3A and 3B.

Referring to FIG. 3A, the 5G system structure may include the electronic device 101 (for example, a user equipment (UE)), a radio access network ((R)AN) 302, a data network (DN) 345, and a plurality of network functions (NFs) within a core network (CN) which are network elements.

The 5G system structure may be defined by a function, a connection point, and a protocol for each of a plurality of NFs and may be illustrated using a reference point indicating an interface based on a service corresponding to the NF and a reference point indicating an interaction existing between NFs.

The plurality of network functions (NFs) may include an authentication server function (AUSF) 309, an access and mobility management function (AMF) 303, a network exposure function (NEF) 347, a network function repository function (NRF) 305, a policy control function (PCF) 307, a session management function (SMF) 341, a unified data management (UDM) 306, a user plane function (UPF) 342, and an application function (AF) 346, and a network slice selection function (NSSF) 304.

In various embodiments of the disclosure, the AMF, the SMF, the PCF, and the UPF may play a key role for establishing a protocol data unit (PDU) requested by the UE ("UE-requested PDU") and managing traffic between the UE and the DN.

A reference point between the electronic device 101 and the AMF 303 is defined as N1.

The (R)AN 302 may indicate a base station using a radio access technology (RAT). For example, the AN 302 may be a base station including a 3GPP access technology or a base station including a non-3GPP access technology such as Wi-Fi. A reference point between the AN 302 and the AMF 303 is defined as N2, and a reference point between the AN and the UPF 342 is defined as N3.

The DN 345 may transfer a PDU to be transmitted in a downlink direction to the UPF 342 and receive a PDU transmitted from the electronic device 101 through the UPF 342. A reference point between the DN 345 and the UPF 342 is defined as N6.

The AMF 303 may provide a function independent from the access technology, for example, an access and mobility management function in units of the electronic device 101. The reference point between the AMF 303 and the electronic device 101 is defined as N1, the reference point between the AMF 303 and the (R)AN 302 is defined as, a reference point between the AMF 303 and the UDM 306 is defined as N8, a reference point between the AMF 303 and the AUSF 309 is defined as N12, and a reference point between the AMF 303 and the SMF 341 is defined as N11.

When one electronic device 101 has a plurality of sessions, different SMFs may be assigned to respective sessions and thus the SMF 341 may provide a session management function for managing each session. The SMF 341 configures the UPF 342 by using generated control signal information, and a reference point N4 is defined to allow the UPF 342 to report its own state to the SMF 341. The reference point between the SMF 341 and the AMF 303 is defined as N11, a reference point between the SMF 341 and the UDM 306 is defined as N10, and a reference point between the SMF 341 and the PCF 307 is defined as N7.

For example, each electronic device 101 can be connected to one AMF 303, but, in the case of the SMF 341, one electronic device 101 can establish a plurality of sessions and thus have different SMF 311, 321, and 331 for respective sessions.

The AF 346 may provide information on the packet flow to the PCF 307 serving to perform policy control in order to guarantee quality of service (QoS).

The PCF 307 may determine a policy of session management and mobility management on the basis of the information on the packet flow to guarantee QoS and transfer the policy to the AMF 303 and the SMF 341, so as to perform appropriate mobility management, session management, and QoS management. A reference point between the AF 346 and the PCF 307 is defined as N5.

The AUSF 309 may store data for authenticating the electronic device 101.

The UDM 306 may store user subscription data and policy data. A reference point between the AUSF 309 and the UDM 306 is defined as N13, a reference point between the AUSF 309 and the AMF 303 is defined as N12, a reference point between the UDM 306 and the AMF 303 is defined as N8, and a reference point between the UDM 306 and the SMF 341 is defined as N10.

CP functions may include various functions for controlling the network and the UE, and the electronic device 101, the (R)AN 302, the UPF 342, the AMF 303, the AF 346, and the DN 345 serving to perform the mobility management function and the SMF 341 serving to perform the session management function which are two representative functions may be included in the CP functions as two independent functions.

In the description of embodiments of the disclosure, a slice, a service, a network slice, a network service, an application slice, and an application service may be interchangeably used.

The mobile network operator may allocate network resource suitable for the corresponding service for each slice or each set of specific slices. The network resources may be the network function (NF) or allocation of logical resources or radio resources provided by the network function (NF).

The network slicing is a technology of grouping network resources and network functions into one independent slice according to the service and providing the slice to apply attributes such as network isolation, customization, and independent management and orchestration to the structure of the mobile communication core network.

The network slicing is a new concept of the 5G core network. The network slicing is a technology of grouping network resources and network functions required for the service requested by the UE into one independent slice and providing the slice.

Through the network slicing, the network operator may independently allocate network resources specialized for each service and user and secure flexibility of the network through resource virtualization based on software defined networking (SDN) and network function virtualization (NFV), so as to guarantee expandability and reliability to operate services and network resources.

A public land mobile network (PLMN) may provide a plurality of network slices, and each network slice may be provided to the UE in the form of slice instances. For example, the PLMN may include slice instance #1 310, slice instance #2 320, and slice instance #3 330.

The electronic device 101 may access the network to simultaneously or sequentially receive services from at least one of the plurality of slice instances.

Each slice instance may include network resources required for providing the corresponding network slice. For example, slice instance #1 310 may include the SMF 311 and the UPFs 312 and 313, slice instance #2 320 may include the SMF 321, the UPF 322, and the PCF 323, and slice instance #3 330 may include the SMF 331, the UPF 332, the PCF 333, and the NRF 334.

Referring to FIGS. 3A and 3B, the SMF 321 of slice instance #2 320 may be connected to the PCF 307 of the PLMN level and the PCF 323 of the slice level. The PCF 307 of the PLMN level may manage policy information of the PLMN level and provide the policy information to the SMF 321. The PCF 323 of the slice level belonging to slice instance #2 may manage a policy required for providing the corresponding slice and provide the corresponding information to the SMF 321.

Each slice may be distinguished by a slice ID. For example, the slice ID may be single-network slice selection assistance information (S-NSSAI) defined by the 3GPP. According to various embodiments, the electronic device 101 may store configured network slice selection assistance information (configured NSSAI) and information on a network slice selection policy (NSSP). The configured NSSAI may include a list of S-NSSAI of the network slices in which the electronic device 101 subscribes to a home PLMN (HPLMN). The list of S-NASSAI may include at least one S-NSSAI #id. For example, the list of S-NASSAI may include S-NASSAI #a, S-NASSAI #b, S-NASSAI #c, and S-NASSAI #d. The configured NSSAI is determined on the basis of subscription information of the electronic device 101, and thus S-NSSAI included in the configured NSSAI may be different for each electronic device 101. Further, the configured NSSAI is determined on the basis of subscription information of the electronic device 101, and thus the configured NSSAI stored in the electronic device 101 may be changed if the subscription information of the electronic device 101 is changed. The list of S-NSSAI to which the electronic device 101 subscribes in the configured NSSAI may be stored in the integrated UDM 306 for storing subscription information of the electronic device 101. The S-NSSAI to which the electronic device 101 subscribes, stored in the UDM 306 may be called 'subscribed S-NS-SAI'. The network slice selection policy (NSSP) indicates mapping information between S-NSSAI (S-NSSAI #id) to which the electronic device 101 subscribes and an application which can be supported by the corresponding S-NSSAI. One S-NSSAI #id may be mapped to at least one application. For example, S-NASSAI #a may be mapped to app #1 and app #2, S-NASSAI #b may be mapped to app #1, S-NASSAI #c may be mapped to app #3, and S-NASSAI #may be mapped to all supportable applications. The NSSP may be stored in the electronic device 101 and the policy control function (PCF) which stores policy information related to the network. Alternatively, the NSSP may be stored in the user data repository (UDR), and the PCF may make a request for NSSP information to the UDR as necessary and acquire the NSSP information from the UDR. When the subscription information of the electronic device 101 is changed, subscribed S-NSSAI of the electronic device 101 stored in the UDM 306 may be changed. When the subscription information of the electronic device 101 is changed, NSSP information stored in the PCF or the UDR may be changed. When at least one of the subscribed S-NSSAI or the NSSPs is changed, relevant configuration information stored in the electronic device 101 may need to be updated.

Figure 4:
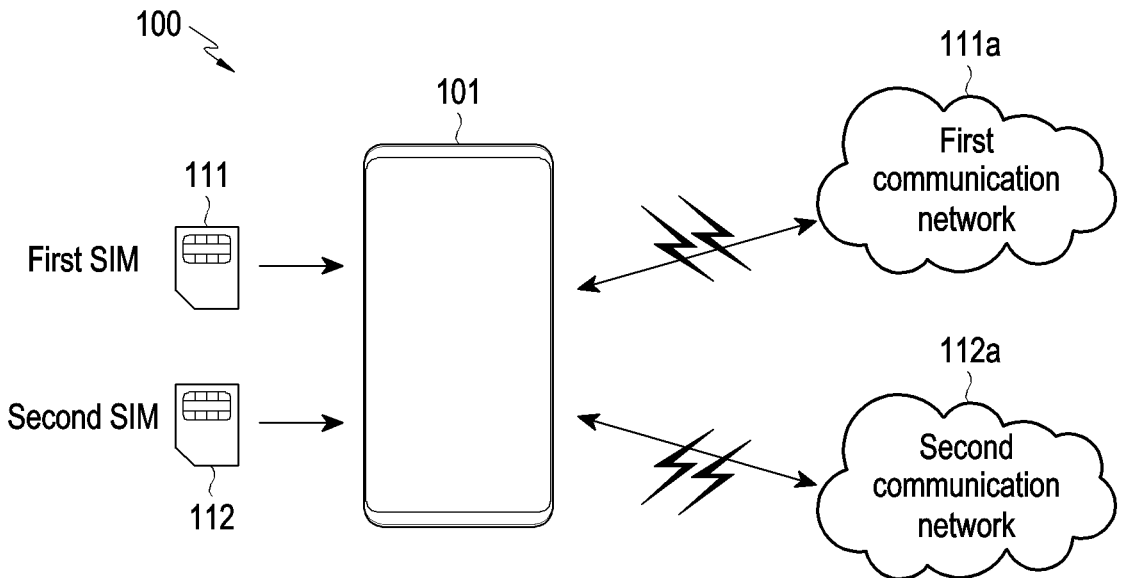
FIG. 4 illustrates a network environment including the electronic device according to an embodiment of the disclosure.

FIG. 4 illustrates the network environment 100 including the electronic device according to an embodiment of the disclosure.

Referring to FIG. 4, the network 100 according to various embodiments of the disclosure may include at least one of the electronic device 101, a first communication network 111*a*, or a second communication network 112*a*.

According to various embodiments, the electronic device 101 may operate in a dual SIM dual standby (DSDS) mode supporting a plurality of SIMs in one device. For example, two SIMs, such as a first SIM 111 and a second SIM 112, can be mounted to the electronic device 101. The first SIM 111 and the second SIM 112 may be removable SIMs (rSIMs). The rSIM may be a SIM which can be removed from a slot included in the electronic device 101, and there no limitation in the form/standard thereof. For example, two SIM cards can be mounted to the electronic device 101 to support the two SIMs. According to another embodiment, although the first SIM 111 and the second SIM 112 are illustrated as the SIM cards for convenience of description, the disclosure is not limited thereto. For example, one of the first SIM 111 or the second SIM 112 may be an embedded SIM (eSIM) or an integrated SIM (iSIM). Hereinafter, for convenience of description, the SIM card is referred to as the SIM. As illustrated in FIG. 4, two SIM cards of the first SIM 111 and the second SIM 112 may be mounted to the electronic device 101. The electronic device 101 may include a first slot (not shown) and a second slot (not shown) corresponding to first structures therein in order to respectively accept each of the first SIM 111 and the second SIM 112.

For example, the first SIM 111 is a SIM subscribing to the MNO of the first communication network 111*a*, and the electronic device 101 may access the first communication network 111*a* through the first SIM 111 to receive a wireless communication service. The second SIM 112 is a SIM subscribing to the MNO of the second communication network 112*a*, and the electronic device 101 may access the second communication network 112*a* through the second SIM 112 to receive a wireless communication service. The first communication network 111*a* and the second communication network 112*a* may be provided by the same MNO or may be separately provided by different MNOs. If the first communication network 111*a* and the second communication network 112*a* are provided by the same MNO, the first communication network 111*a* and the second communication network 112*a* may be the same networks. Alternatively, different MNOs may share a communication network. For example, a first MNO may use the first communication network 111*a* and a second MNO may be configured to also use the first communication network 111*a*. According to yet another embodiment, although not illustrated, the electronic device 101 may further include at least one additional SIM, and those skilled in the art may easily understand that there is no limitation in the number or type of SIMs.

Figure 5:
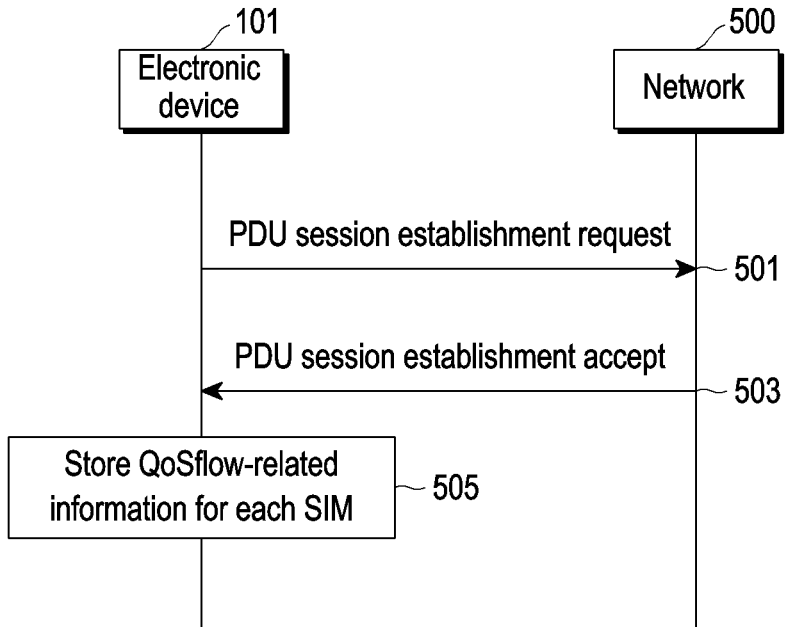
FIG. 5 is a flowchart illustrating a method of operating electronic device according to an embodiment of the disclosure.

FIG. 5 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2A) may transmit a PDU session establishment request message to a network 500 (for example, the AMF and/or the SMF) in operation 501. The PDU session establishment request may be a message for initiating establishment of a PDU session.

According to various embodiments, the electronic device 101 may transmit and receive the PDU session establishment request on the basis of a UE route selection policy (URSP) rule. The electronic device 101 may receive, for example, the URSP rule from the PCF 307. Alternatively, the electronic device 101 may acquire the URSP rule through another route, not from the PCF 307, and there is no limitation in a scheme of acquiring the URSP rule. For example, the electronic device 101 may receive a first URSP rule corresponding to the first SIM 111 from the PCF corresponding to the first SIM 111 and receive a second URSP rule corresponding to the second SIM 112 from the PCF corresponding to the second SIM 112. When the electronic device 101 accesses the network on the basis of information on the first SIM 111, the electronic device 101 may transmit the PDU session establishment request based on the first URSP rule corresponding to the first SIM 111 to the network 500. When the electronic device 101 accesses the network on the basis of information on the second SIM 112, the electronic device 101 may transmit the PDU session establishment request based on the second URSP rule corresponding to the second SIM 112 to the network 500.

For example, the URSP rule may include a traffic descriptor and a route selection descriptor. The traffic descriptor may include at least one of an application identifier, IP2 tuple(s), a non-IP descriptor, or a data network name (DNN) according to 3rd generation partnership project (3GPP) technical specification (TS) 24.524. For example, the URSP rule may include a list of descriptors (a list of route selection descriptors) for route selection. The list of descriptors may include at least one piece of information for network slice selection, information for DNN selection, information for SSC mode selection, information for PDU session type selection, non-seamless offload indication information, or access type preference information according to 3GPP TS For example, when one or more DNNs are included in the traffic descriptor, the path selection descriptor may not include the DNN. Meanwhile, various embodiments of the disclosure are not necessarily limited to 3GPP TS 23.503 and/or 3GPP TS 24.526, and those skilled in the art may understand that descriptors according to various embodiments of the disclosure include other information. The information for network slice selection may be, for example, a single value or a list of values of S-NSSAI(s). The information for DNN selection may be, for example, a single value or a list of values of DNN(s). The information for SSC mode selection may be, for example, a single value of an SSC mode. The information for PDU session type selection may include, for example, a single value of a PDU session type. The non-seamless offload indication information may indicate, for example, whether data of a matching application is offloaded by non-3GPP access outside the PDU session. The access type preference information may indicate, for example, a preferred access type (3GPP or non-3GPP) in the case in which the UE establishes a PDU session for a matching application. According to the above description, when receiving a network connection request (or a network request) from a specific application, the electronic device 101 may identify at least one descriptor corresponding to the specific application. The network connection request may include application identification information. At least one descriptor may include at least one some of, for example, descriptors included in the traffic descriptor or descriptors included in the route selection descriptor. The application may correspond to at least one descriptor, which may be expressed that one descriptor set may correspond to the application. The PDU session request message transmitted in operation 501 may include the DNN identified on the basis of the URSP rule.

According to various embodiments, the network 500 may determine whether the PDU session for the electronic device 101 is established. When the network 500 determines that the PDU session has been established for the electronic device 101, the network 500 may transmit a PDU session establishment accept message to the electronic device 101 in operation 503. The PDU session establishment accept message may include at least one of a PDU session ID, a PDU address, S-NSSAI, 5G QoS identifier (5QI), a DNN, session-aggregated maximum bit rate (AMBR), or a QoS flow description, but there is no limitation in information included therein. Table 1 is an example of the PDU session establishment accept message.

TABLE 1

Message type: PDU session establishment accept (0xc2)
QoS rules - Authorized QoS rules
Session-AMBR
  Length: 6
  Unit for Session-AMBR for downlink: value is incremented in
multiples of 1 Mbps (6)
  <u>Session-AMBR for downlink: 512000 Kbps (500)</u>
  Unit for Session-AMBR for uplink: value is incremented in multiples
of 1 Mbps (6)
  <u>Session-AMBR for uplink: 102400 Kbps (100)</u>
  PDU address
    Element ID: 0x29
    Length: 13
    .... 0011 = PDU session type: IPv4v6 (3)
    PDU address information: 1635815bad68fcfe
    PDU address information: 10.44.0.1
  <u>S-NSSAI</u>
    <u>Element ID: 0x22</u>
    <u>Length: 1</u>
    <u>Slice/service type (SST): 1</u>
QoS flow descriptions - Authorized
  Element ID: 0x79
  Length: 9
  QoS flow description 1
    ..00 0001 = Qos flow identifier: 1
    001. .... = Operation code: Create new QoS flow description (1)
  .1.. .... = E bit: 1
    ..00 0010 = Number of parameters: 2
    Parameter 1 - EPS bearer identity
      Parameter identifier: EPS bearer identity (7)
      Length: 1
      Parameters content: Unknown (80)
    Parameter 2 - 5QI
      Parameter identifier: 5QI (1)
      Length: 1
<u>Parameters content: 5QI 9 (9)</u>
<u>DNN</u>
  Element ID: 0x25
  Length: 6
<u>DNN: cmnet</u>

As indicated by the underline, the PDU session establishment accept message may include session-AMBR for downlink, session-AMBR for uplink, S-NSSAI, 5QI, and a DNN. Table 2 is an example of a QoS flow description included in the PDU session establishment accept message.

TABLE 2 spec 24.501
  6.2.5.1.1.4 QoS flow descriptions
  The network can also provide the UE with one or more QoS flow descriptions
associated with a PDU session at the TABLE 2-continued PDU session establishment or at the PDU session modification.
Each QoS flow description contains:
a) a QoS flow identifier (QFI);
b) if the flow is a GBR QoS flow:
1) Guaranteed flow bit rate (GFBR) for UL;
2) Guaranteed flow bit rate (GFBR) for DL;
Table 9.11.4.12.1: QoS flow descriptions information element
    The parameter identifier field is used to identify each parameter included in the
parameters list and it contains the hexadecimal coding of the parameter identifier.
    Bit 8 of the parameter identifier field contains the most significant bit and bit 1
contains the least significant bit.
    In this version of the protocol, the following parameter identifiers are specified:
    - 01H (5QI);
    - 02H (GFBR uplink);
    - 03H (GFBR downlink);
    - 04H (MFBR uplink);
    - 05H (MFBR downlink);
    When the parameter identifier indicates "GFBR uplink", the parameter contents
field contains one octet indicating the unit of the guaranteed flow bit rate for uplink followed
by two octets containing the value of the guaranteed flow bit rate for uplink.
    Unit of the guaranteed flow bit rate for uplink As indicated by the underline, the QoS flow description may include guaranteed flow bit rates (GFBRs) for uplink and downlink.

According to various embodiments, the electronic device 101 may store QoS flow-related information for each SIM in operation 505, which may be named a QoS table for convenience of description. Table 3 is an example of the QoS table.

include at least one of a resource type, a precedence, a packet delay budget, a packet error rate, a default maximum data burst volume, and a default averaging window, and there is no limitation in an item compared for SIM selection.

Meanwhile, entries of the QoS table of Table 3 may be empty at a time point at which the electronic device 101 is initially booted or the electronic device 101 moves to a new roaming region. In this case, the electronic device 101 may

TABLE 3

| SIM (PLMN) | DNN | S-NSSAI/SST | 5QI | AMBR DLKbps) | AMBR UL(Kbps) | GBR UL | GBR DL |
|---|---|---|---|---|---|---|---|
| SIM1(450 01) | 'cmnet' | 1(eMBB) | B | 102400 | 512000 | 102400 | 512000 |
| | 'ims' | 1(URLLC) | C | 409600 | 6,553,600 | 409600 | 6,553,600 |
| | 'internet' | 2(eMBB) | D | 40960000 | 6,553,60000 | 40960000 | 6,553,60000 |
| SIM2(310 012) | 'vzwinternet' | 1(eMBB) | 5 | 102400 | 512000 | 102400 | 512000 |
| | 'vzwapp' | 1(eMBB) | 6 | 102400 | 512000 | 102400 | 512000 |
| | 'vzwims' | 2(URLLC) | 7 | 409600 | 6,553,600 | 409600 | 6,553,600 |

Referring to Table 3, the electronic device 101 may store three pieces of QoS flow-related information for the first SIM 111 corresponding to a first PLMN (for example, 450 01) and store three pieces of QoS flow-related information for the second SIM 112 corresponding to a second PLMN (for example, 310 012). The electronic device 101 may store relevant QoS flow-related information for each SIM whenever the PDU session is established. The stored information in Table 3 is only an example, and there is no limitation in stored information. When a specific application is executed (or a network connection request from a specific application is identified), the electronic device 101 may select a SIM for the corresponding application by using the QoS table of Table 3. For example, when a network slice type corresponding to the application is eMBB, the electronic device 101 may select the first SIM as a SIM for the application on the basis of information indicating that an AMBR value corresponding to a DNN of "internet" corresponding to the first SIM 111 is larger than an AMBR value of the second SIM 112. For example, when a network slice type corresponding to the application is URLLC, the electronic device 101 may select the first SIM as a SIM for the application on the basis of information indicating that a packet delay budget of 5QI corresponding to a DNN of "ims" corresponding to the first SIM 111 is smaller than a packet delay budget of 5QI of the second SIM 112. For example, the 5QI may select the URSP rule on the basis of precedence of the URSP rule without consideration of the SIM. Alternatively, the electronic device 101 may receive QoS-related information from the network or a QoS management server, which will be described below.

Figure 6A:
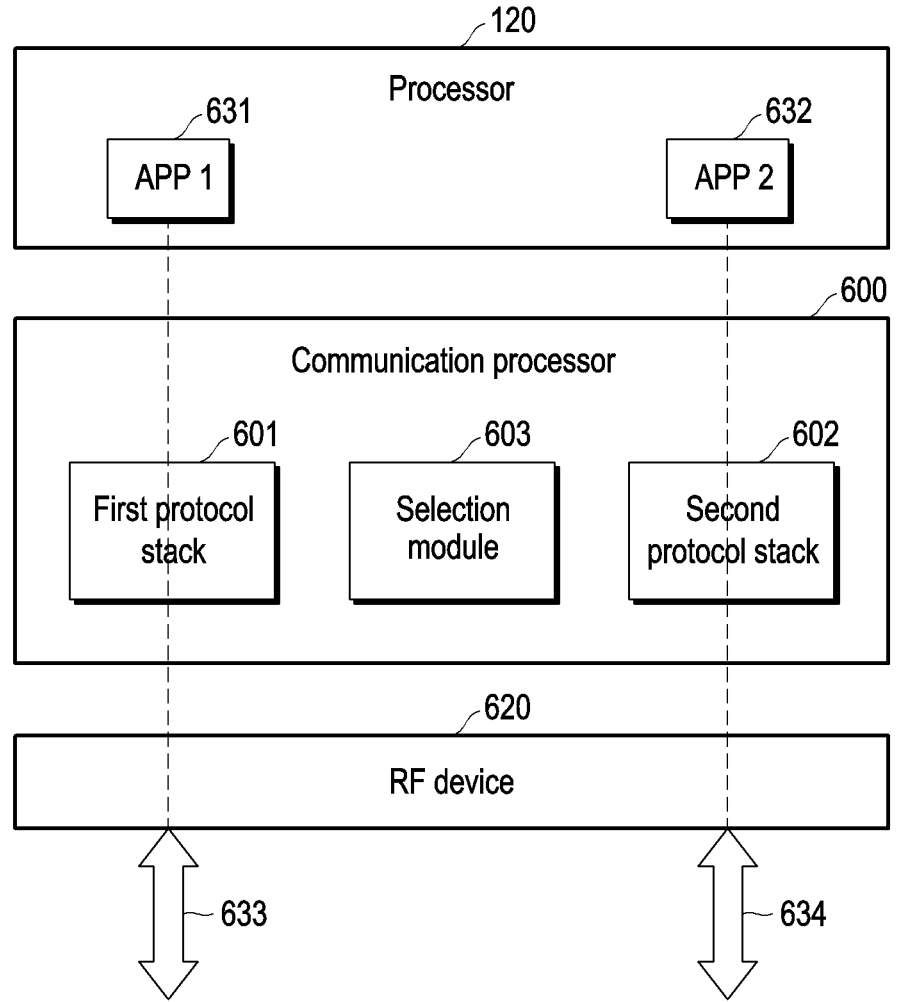
FIG. 6A is a block diagram illustrating the electronic device according to an embodiment of the disclosure.

FIG. 6A is a block diagram illustrating the electronic device according to an embodiment of the disclosure.

According to various embodiments, the processor 120 may execute a first application 631 or a second application 632. A first protocol stack 601 corresponding to the first SIM 111 and a second protocol stack 602 corresponding to the second SIM 112 may be stored in and/or executed by a communication processor 600 (for example, at least one of the first communication processor 212 of FIG. 2A, the second communication processor 214 of FIG. 2A, or the integrated communication processor 260). The protocol stacks 601 and 602 may process, for example, data from the processor 120 and provide the data to an RF device 620 or may process data from the RF device 620 and provide the data to the processor 120. The protocol stacks 601 and 602 may include, for example, an L1 layer, an L2 layer, and/or an L3 layer, but there is not limitation therein. A selection module 603 may manage, for example, the QoS table of Table 3. For example, when a PDU session is established, the selection module 603 may add QoS-related information corresponding to the established PDU session. When receiving a network connection request from a specific application, the selection module 603 may select one of the first SIM 111 or the second SIM 112 on the basis of the QoS table. The selection module 603 may provide a PDU session connection request to a protocol stack corresponding to the selected SIM on the basis of a URSP rule corresponding to the selected SIM.

For example, the first application 631 is executed, and the network connection request may be provided to the communication processor 600. The selection module 603 may identify an item to be compared among items in the QoS table on the basis of characteristics of the first application 631 (for example, a DNN and/or a network slice type). For example, when the network slice type of the first application 631 is eMBB the selection module 603 may select an AMBR as the item to be compared. The selection module 603 may identify that the AMBR corresponding to the first SIM 111 is higher than the AMBR corresponding to the second SIM 112 on the basis of the QoS table. The selection module 603 may select the first SIM 111 as a SIM for the first application 631. The selection module 603 may provide a PDU session establishment request to the first protocol stack 601 corresponding to the first SIM 111. Accordingly, the first protocol stack 601 may establish a first PDU session 633 based on the first SIM 111 through the RF device 620. For example, when the network slice type of the second application 632 is URLLC, the selection module 603 may select a packet delay budget of 5QI as the item to be compared. The selection module 603 may identify that the packet delay budget of 5QI corresponding to the second SIM 112 is lower than the packet delay budget of 5QI corresponding to the first SIM 111 on the basis of the QoS table. The selection module 603 may select the second SIM 112 as a SIM for the second application 632. The selection module 603 may provide a PDU session establishment request to the second protocol stack 602 corresponding to the second SIM 112. Accordingly, the second protocol stack 602 may establish a second PDU session 634 based on the second SIM 112 through the RF device 620.

Figure 6B:
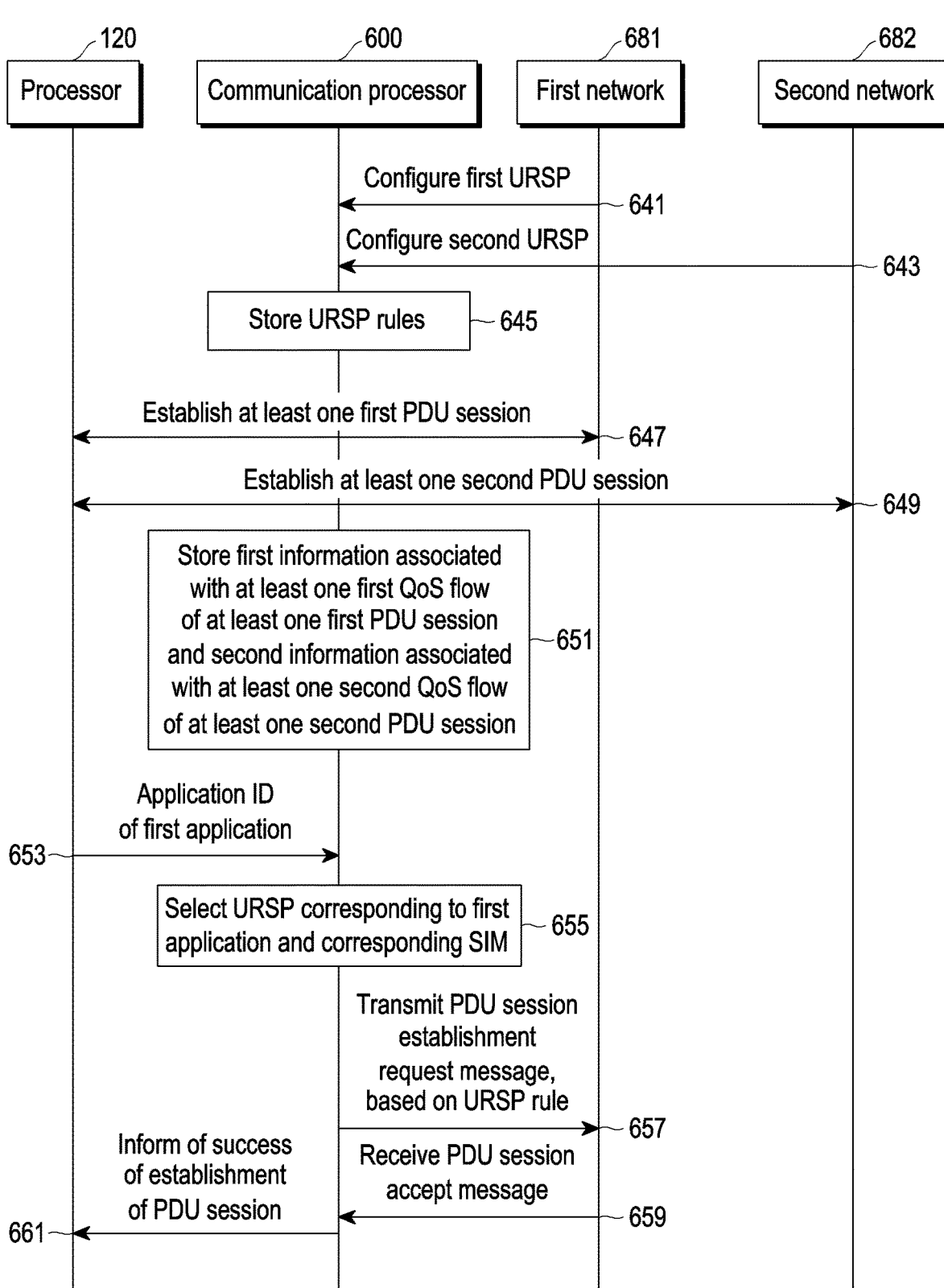
FIG. 6B is a flowchart illustrating a method of operating the electronic device according to an embodiment of the disclosure.

FIG. 6B is a flowchart illustrating a method of operating the electronic device according to an embodiment of the disclosure.

According to various embodiments, the communication processor 600 (for example, at least one of the first communication processor 212 of FIG. 2A, the second communication processor 214 of FIG. 2A, or the integrated communication processor 260 of FIG. 2B) may receive a first URSP configuration from a first network 681 corresponding to the first SIM 111 in operation 641. The first URSP configuration may include at least one URSP rule. The communication processor 600 may receive a second URSP configuration from a second network 682 corresponding to the second SIM 112 in operation 643. The second URSP configuration may include at least one URSP rule. In operation 645, the communication processor 600 may store URSP rules included in the first URSP configuration and/or the second URSP configuration.

According to various embodiments, the processor 120 may establish at least one first PDU session with the first network 681 in operation 647. The processor 120 may establish at least one second PDU session with the second network 682 in operation 649. In operation 651, the communication processor 600 may store first information related to at least one first QoS flow of at least one first PDU session and second information related to at least one second QoS flow of at least one second PDU session. Accordingly, for example, the QoS table of Table 3 may be configured. SIM selection in the state in which no information is stored in the QoS table is described below.

According to various embodiments, the processor 120 may provide the network connection request including an application ID of the first application to the communication processor 600, for example, the selection module 603 in operation 653. The communication processor 600 may select a URSP rule corresponding to the first application and a corresponding SIM in operation 655. For example, the communication processor 600 may select an item to be compared among items of the QoS table on the basis of characteristics of the first application (for example, a DNN and/or a network slice type). The communication processor 600 may compare a value corresponding to the first SIM 111 of the item to be compared with a value corresponding to the second SIM 112 and select one SIM on the basis of the comparison result. For example, it is assumed that the first SIM 111 is selected. The communication processor 600 may transmit the PDU session establishment request message to the first network 681 on the basis of the URSP rule of the selected SIM, for example, the first SIM 111 in operation 657. The first network 681 may receive a PDU session accept message in operation 659. The communication processor 600 may inform the processor 120 of success of the PDU session establishment in operation 661. The first application may transmit and receive data through the established PDU session.

Figure 7:
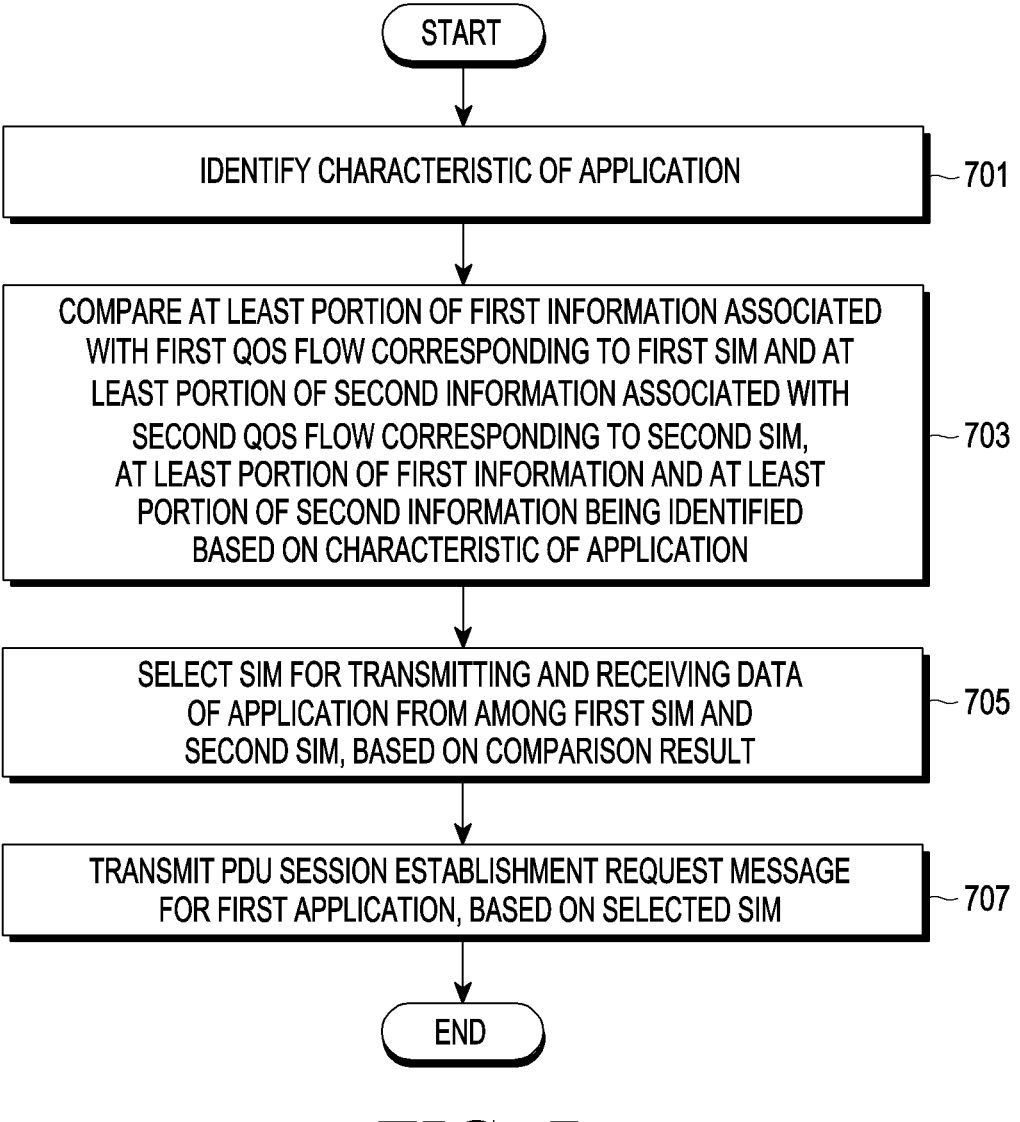
FIG. 7 is a flowchart illustrating a method of operating the electronic device according to an embodiment of the disclosure.

FIG. 7 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may identify a characteristic of an executed application (or an application making a request for a network connection) in operation 701. In one example, the electronic device 101 may identify a network slice type corresponding to the application as the characteristic of the application. Alternatively, the electronic device 101 may identify various pieces of information, for example, a DNN as well as the network slice type as the characteristic of the application, and there is no limitation in the type of the application.

According to various embodiments, the electronic device 101 may compare at least some of the first information related to the first QoS flow corresponding to the first SIM 111 and at least some of the second information related to the second QoS flow corresponding to the second SIM 112, the first information and the second information being identified on the basis of the characteristic of the application in operation 703. For example, the first information related to the first QoS flow corresponding to the first SIM 111 and the second information related to the second QoS flow may include value for a plurality of items as shown in Table 3. The electronic device 101 may determine at least some of a plurality of items as items to be compared on the basis of the characteristic of the application. For example, when the network slice type corresponding to the application is eMBB, the electronic device 101 may compare a value of the AMBR item in the first information related to the first QoS flow with a value of the AMBR item in the second information related to the second QoS flow. For example, when the network slice type corresponding to the application is URLLC, the electronic device 101 may compare a value of the packet delay budget item of 5QI in the first information related to the first QoS flow with a value of the packet delay budget item of 5QI in the second information related to the second QoS flow. The electronic device 101 may select a SIM for data transmission and reception of the application from among the first SIM 111 and the second SIM 112 on the basis of the comparison result in operation 705.

According to various embodiments, the electronic device 101 may transmit a PDU session establishment request message for the first application on the basis of the selected SIM in operation 707. For example, the electronic device 101 may allocate the use of the RF device 620 to the selected SIM. The electronic device 101 may transmit the PDU session establishment request message to the network corresponding to the selected SIM on the basis of a protocol stack corresponding to the selected SIM. When a PDU session corresponding to the selected SIM and having the corresponding characteristic has been already established, the electronic device 101 may allocate the use of the RF device 620 to the selected SIM and associate the first application with the corresponding PDU session. Accordingly, the first application may transmit and receive data on the basis of the pre-established PDU session.

FIG. 8 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may identify that a network slice type of an executed application (or an application making a request for a network connection) is URLLC in operation 801. In operation 803, the electronic device 101 may compare a first value of an item associated with latency in a plurality of items associated with the first QoS flow with a second value of an item associated with latency among a plurality of items associated with the second QoS flow on the basis of information indicating that the network slice type of the application is URLLC. For example, among a plurality of items (5QI, AMBR DL, AMBR UL, guaranteed bit rate (GBR) UL, and GBR DL) in QoS table of Table 3, the packet delay budget of 5QI may be determined as an item to be compared. Meanwhile, the packet delay budget is only an example, and those skilled in the art may understand that any item related to latency, such as a delay critical GBR, can be the item to be compared.

According to various embodiments, the electronic device 101 may select a SIM corresponding to smaller latency on the basis of the comparison result of a value corresponding to the first SIM 111 of the item to be compared with a value corresponding to the second SIM 112 of the item to be compared in operation 805. The electronic device 101 may transmit the PDU session establishment request message for the first application on the basis of the selected SIM in operation 807. The electronic device 101 may allocate the use of the RF device 620 to the selected SIM, and accordingly, transmit the PDU session establishment request message on the basis of the protocol stack based on the selected SIM. When a PDU session corresponding to the selected SIM and having the network slice type of URLLC has been already established, the electronic device 101 may allocate the use of the RF device 620 to the selected SIM and associate the first application with the corresponding PDU session.

The value corresponding to the first SIM 111 of the item to be compared may be the same as the value corresponding to the second SIM 112 of the item to be compared according to circumstances. In this case, the electronic device 101 may compare a value corresponding to the first SIM 111 of a next priority item to be compared (for example, the delay critical GBR) with a value corresponding to the second SIM 112. Accordingly, a PDU session which can support smaller latency may be established, and thus a delay of data transmission and reception of the application requiring URLLC may be reduced.

Figure 9:
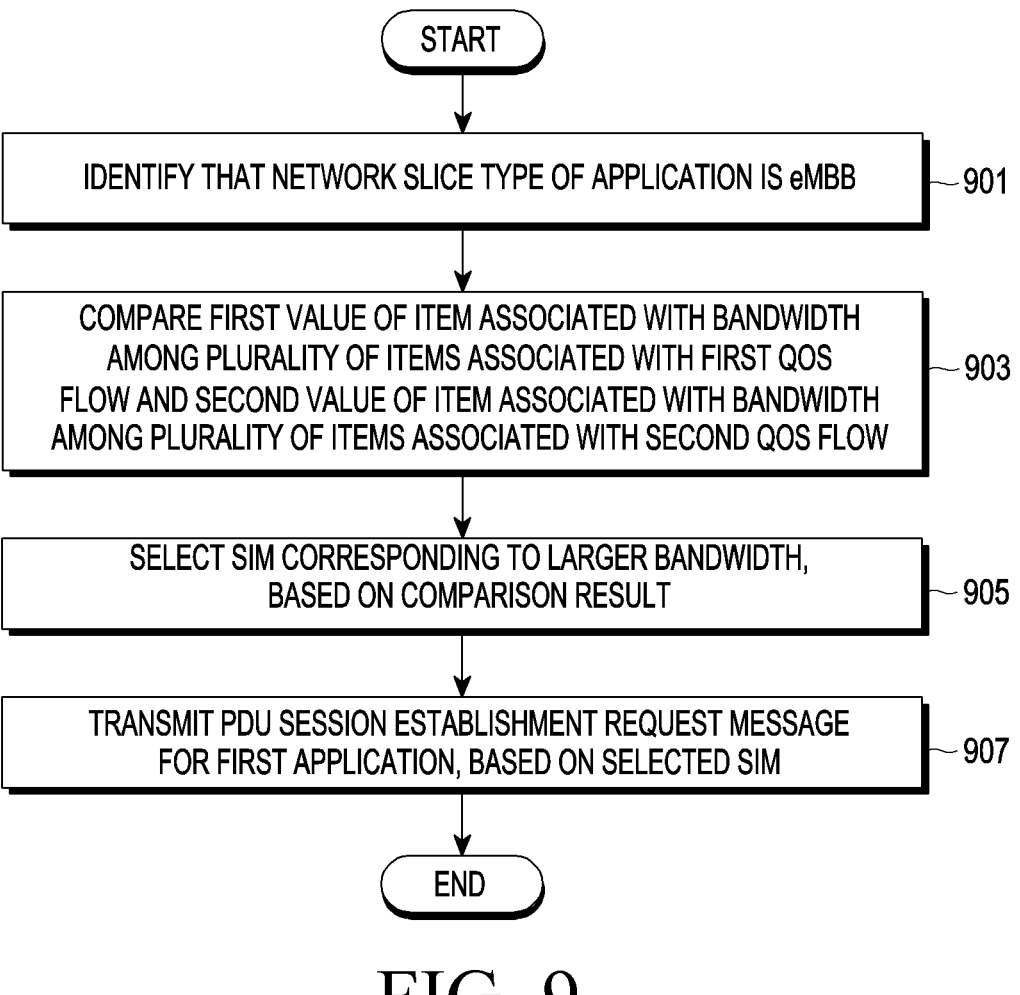
FIG. 9 is a flowchart illustrating a method of operating the electronic device according to an embodiment of the disclosure.

FIG. 9 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may identify that a network slice type of an executed application (or an application making a request for a network connection) is eMBB in operation 901. In operation 903, the electronic device 101 may compare a first value of an item associated with a bandwidth among a plurality of items associated with the first QoS flow with a second value of an item associated with a bandwidth among a plurality of items associated with the second QoS flow on the basis of information indicating that the network slice type of the application is eMBB. For example, among a plurality of items (5QI, AMBR DL, AMBR UL, GBR UL, and GBR DL) in QoS table of Table 3, the AMBR DL may be determined as an item to be compared. Meanwhile, the AMBR DL is only an example, and those skilled in the art may understand that any item related to the bandwidth can be item to be compared.

According to various embodiments, the electronic device 101 may select a SIM corresponding to smaller latency on the basis of the comparison result of a value corresponding to the first SIM 111 of the item to be compared with a value corresponding to the second SIM 112 of the item to be compared in operation 905. The electronic device 101 may transmit the PDU session establishment request message for the first application on the basis of the selected SIM in operation 907. The electronic device 101 may allocate the use of the RF device 620 to the selected SIM, and accordingly, transmit the PDU session establishment request message on the basis of the protocol stack based on the selected SIM. When a PDU session corresponding to the selected SIM and having the network slice type of eMBB has been already established, the electronic device 101 may allocate the use of the RF device 620 to the selected SIM and associate the first application with the corresponding PDU session. Accordingly, a PDU session which can support smaller latency may be established and a speed of large data transmission and reception of the application requiring eMBB may be increased. Meanwhile, as illustrated in FIG. 8, when the value of the first SIM 111 and the value of the second SIM 112 corresponding to the item of the AMBR are the same, the electronic device 101 may compare values for a next priority item of eMBB.

Figure 10:
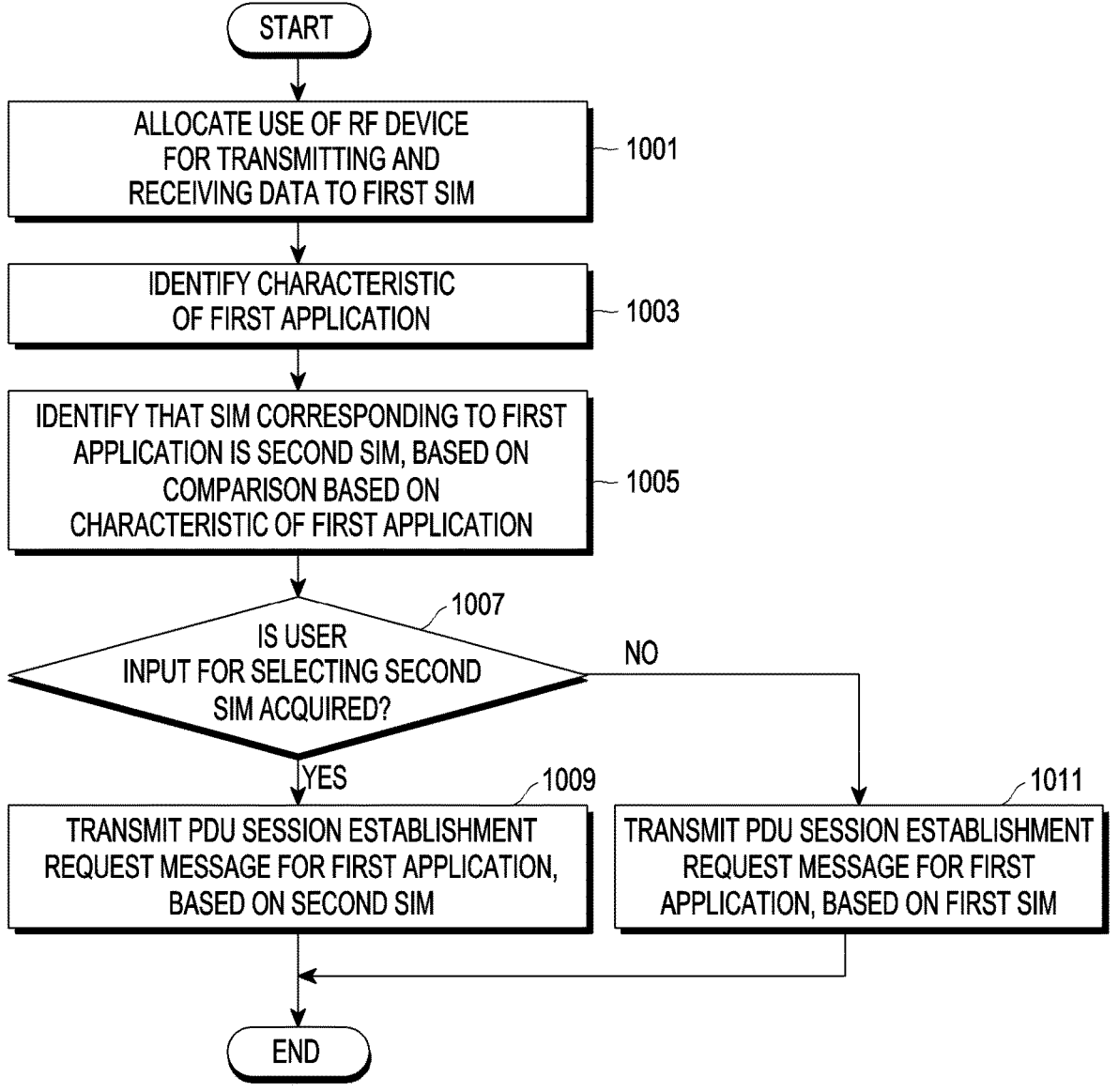
FIG. 10 is a flowchart illustrating a method of operating the electronic device according to an embodiment of the disclosure.
Figure 11:
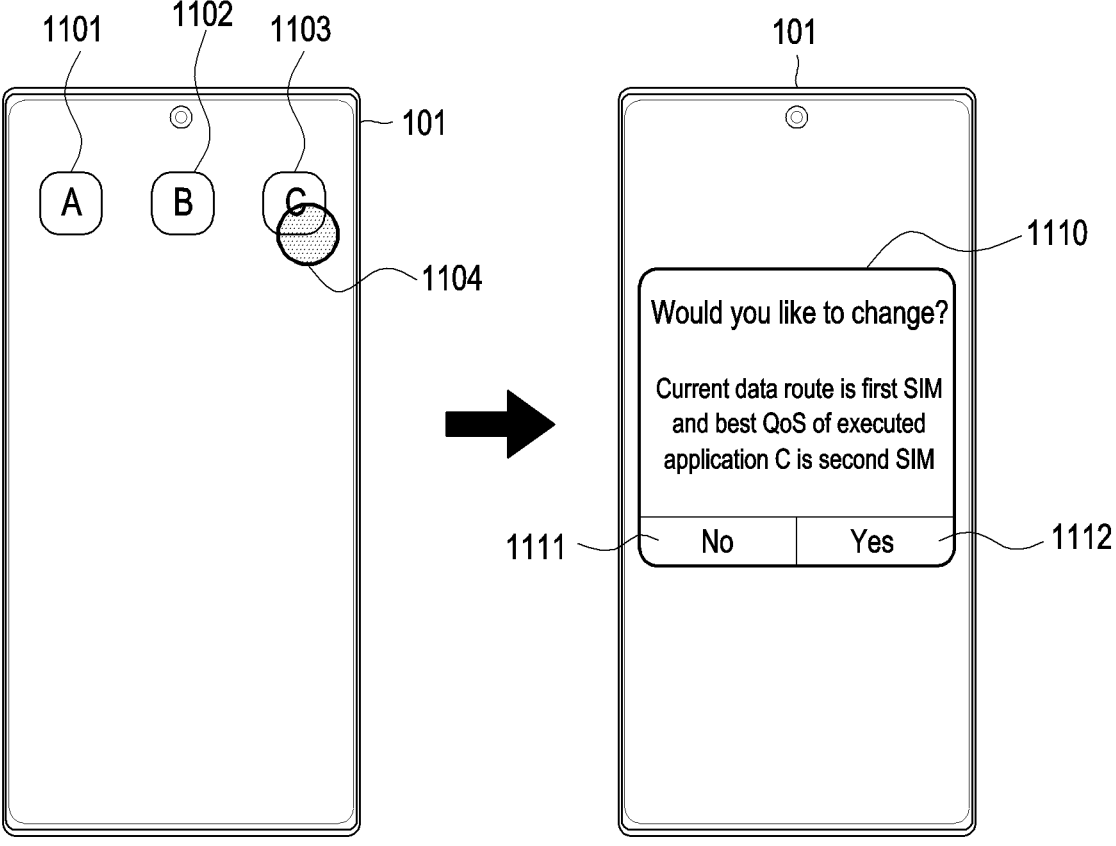
FIG. 11 illustrates a screen displayed by the electronic device according to an embodiment of the disclosure.

FIG. 10 is a flowchart illustrating a method of operating an electronic device according to an embodiment of the disclosure. The embodiment of FIG. 10 will be described with reference to FIG. 11. FIG. 11 illustrates a screen displayed by the electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may allocate the use of the RF device 620 for data transmission and reception to the first SIM 111 before the first application is executed or before a request for the network connection from the first application is made in operation 1001. There is no limitation in a condition of allocation of the RF device 620 to the first SIM 111.

According to various embodiments, the electronic device 101 may identify a characteristic of the first application, for example, a network slice type corresponding to the first application on the basis of the execution of the first application or the request for the network connection from the first application in operation 1003. The electronic device 101 may identify that a SIM corresponding to the first application is the second SIM 112 on the basis of comparison based on the characteristic of the first application in operation 1005. For example, when the network slice type corresponding to the first application is URLLC, the electronic device 101 may determine the packet delay budget of 5QI in the QoS table of Table 3 as the item to be compared. The electronic device 101 may identify that a value for the item of the packet delay budget of 5QI of information corresponding to the second SIM 112 is smaller than a value for the item of the packet delay budget of 5QI of information corresponding to the first SIM 111. Accordingly, the electronic device 101 may identify that the SIM corresponding to the first application according to the network slice type of URLLC is the second SIM 112.

According to various embodiments, the electronic device 101 may determine whether a user input for selecting the second SIM 112 is acquired in operation 1007. For example, the electronic device 101 may display icons 1101, 1102, and 1103 for executing a plurality of applications as illustrated in the left part of FIG. 11. The electronic device 101 may select the second SIM 112 as the SIM corresponding to the second application as described above on the basis of the execution of the second application according to selection 1104 of an icon 1103 corresponding to the second application (for example, application "C" of FIG. 11). The electronic device 101 may display a popup window 1110 inquiring about whether to change the SIM for data transmission and reception to the second SIM 112 as illustrated in the right part of FIG. 11. The popup window may include information indicating that the current data route is the first SIM 111 and optimal QoS of the executed application C is the second SIM 112 and the content indicating whether to accept a change, but there is no limitation in the message. The popup window 1110 may include a button 1111 for rejection and a button 1112 for acceptance. The user of the electronic device 101 may have a different charging policy for each subscribed network operator, and the user may determine whether to perform switching to the second SIM 112 according thereto. According to various embodiments, the electronic device 101 may display basic charging policy comparison information of the first SIM 111 and the second SIM 112 and comparison information for charging and/or performance expected for the user of the first application in at least a part of the popup window 1110, and the same may be referred to by the user.

According to various embodiments, when a user input for selecting the second SIM 112 is acquired (1107—yes), the electronic device 101 may transmit a PDU session establishment request message for the first application on the basis of the second SIM 112 in operation 1009. For example, in the example of FIG. 11, the electronic device 101 may change the first SIM 111 to the second SIM 112 to allocate the use of the RF device 620 to the second SIM 112 on the basis of the selection of the button 1112 for acceptance and transmit a PDU session establishment request message on the basis of the protocol stack of the second SIM 112. When a user input for selecting the second SIM 112 is not acquired (1107—no), the electronic device 101 may transmit a PDU session establishment request message for the first application on the basis of the first SIM 111 in operation 1011. For example, in the example of FIG. 11, the electronic device 101 may transmit a PDU session establishment request message on the basis of the protocol stack of the first SIM 111 while maintaining allocation of the user of the RF device 620 to the first SIM 111 on the basis of the selection of the button 1111 for rejection. Although not illustrated, when the first SIM 111 is selected as the SIM corresponding to the first application, the electronic device 101 may establish a PDU session corresponding to the first application on the basis of the first SIM 111 without any separate user input.

Meanwhile, switching to the second SIM 112 may be determined in the state in which at least one PDU session established on the basis of the first SIM 111 exist before the switching to the second SIM 112. For example, before the switching to the second SIM 112, a PDU session for the second application and a PDU session for a third application have been already established on the basis of the first SIM 111. In such a state, when the user of the RF device 620 is allocated to the second SIM 112, PDU sessions for the second application and the third application cannot be used. The electronic device 101 may newly establish PDU Sessions corresponding to the PDU sessions established on the basis of the first SIM 111 after the switching to the second SIM 112. For example, the electronic device 101 may establish PDU sessions for the second application and the third application corresponding to the second SIM 112 by using the URSP rule of the second SIM 112 corresponding to information (for example, a DNN and/or S-NSSAI) on the PDU sessions for the second application and the third application established on the basis of the first SIM 111. Accordingly, data transmission and reception of the second application and the third application may continue after the switching to the second SIM 112. Meanwhile, the PDU sessions established to correspond to the first SIM 111 may be maintained or removed after the switching to the second SIM 112. Meanwhile, when data transmission and reception through the PDU session of the first SIM 111 are provided from the second application or the third application, the electronic device 101 may block the same.

Figure 12:
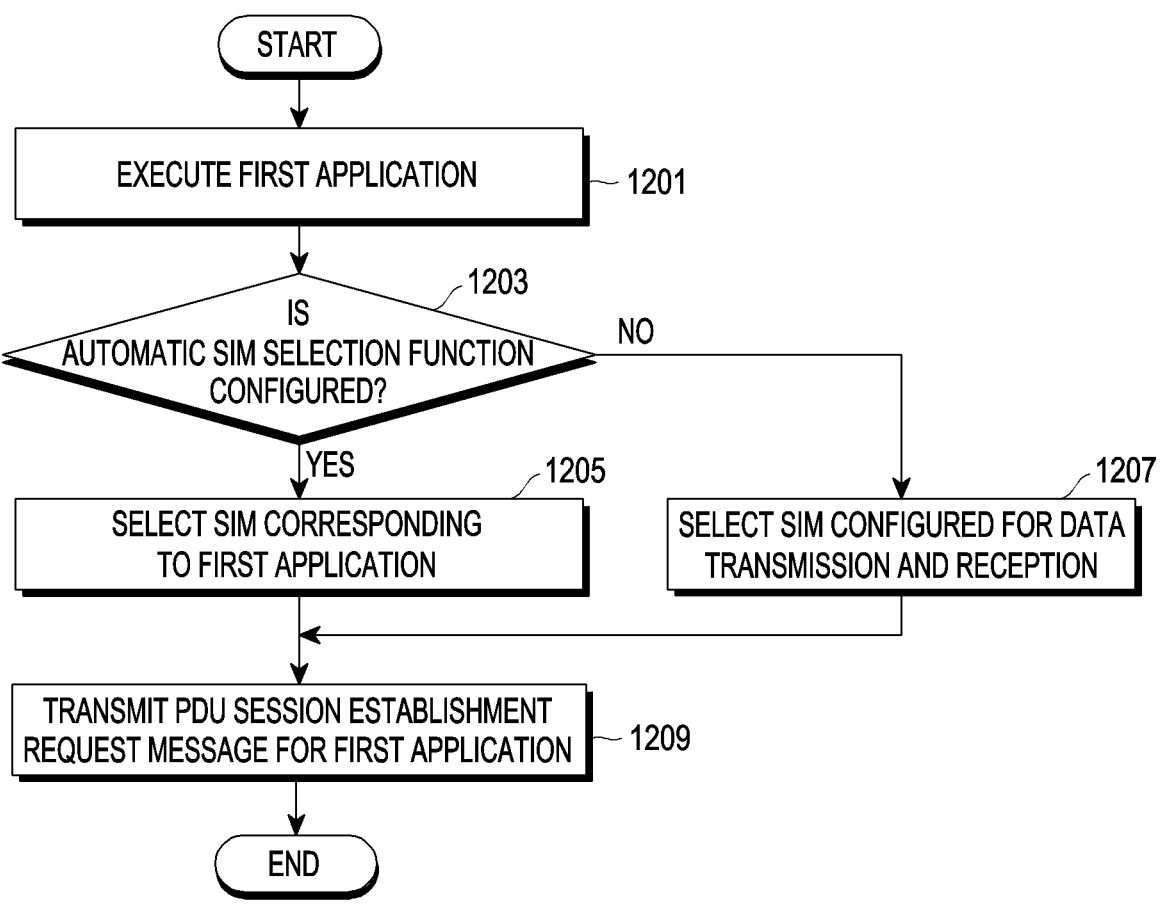
FIG. 12 is a flowchart illustrating a method of operating the electronic device according to an embodiment of the disclosure.
Figure 13:
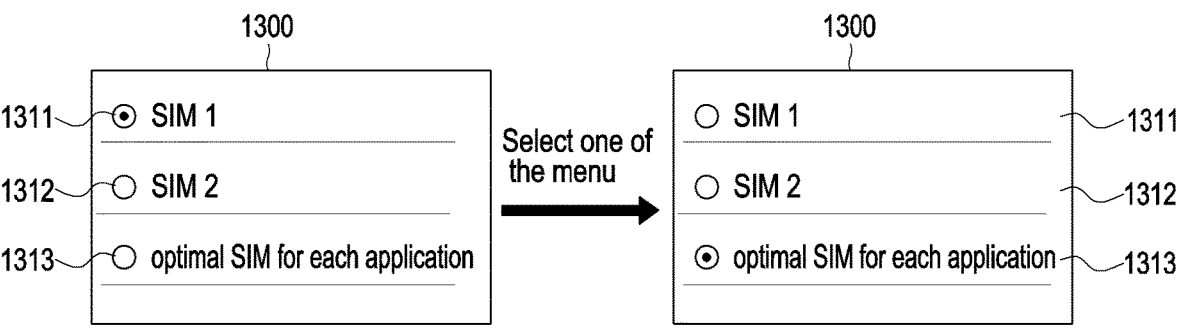
FIG. 13 illustrates a screen displayed by the electronic device according to an embodiment of the disclosure.

FIG. 12 is a flowchart illustrating a method of operating an electronic device according to an embodiment of the disclosure. The embodiment of FIG. 12 will be described with reference to FIG. 13. FIG. 13 illustrates a screen displayed by the electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may execute a first application in operation 1201. The electronic device 101 may determine whether an automatic SIM selection function is configured in operation 1203. The automatic SIM selection function may be a function of, when, for example, a specific application is executed (or the specific application makes a request for a network connection) automatically selecting a SIM optimized for the specific application by the electronic device 101 and establishing a PDU session (or connecting the specific application to the pre-established PDU session) by using the corresponding SIM. For example, as illustrated in the left part of FIG. 13, the electronic device 101 may display a configuration screen 1300 related to the SIM. The configuration screen 1300 may include a first tab 1311 for selecting the first SIM, a second tab 1312 for selecting the second SIM, and a third tab 1313 for selecting a SIM of the best URSP. The configuration screen 1300 may include a selector indicating selection of one of the tabs 1311, 1312, and 1313. For example, the configuration screen 1300 in the case in which the first tab 1311 is selected may be displayed in the left part of FIG. 13, in which case the selector may be displayed on the first tab 1311. When the specific application is executed (or the specific application makes the request for the network connection) in the state in which the first tab 1311 is selected, the electronic device 101 may establish a PDU session on the basis of the protocol stack of the first SIM 111. When the third tab 1313 is selected, the configuration screen 1330 in which the selector is displayed on the third tab 1313 may be provided as illustrated in the right part of FIG. 13. When the third tab 1313 is selected, the electronic device 101 may configure the automatic SIM selection function. Meanwhile, the configuration through a UI as illustrated in FIG. 13 is only an example, and there is no limitation in a configuration method of the automatic SIM selection function.

When the automatic SIM selection function is configured (1203—yes), the electronic device 101 may select a SIM corresponding to the first application in operation 1205 according to various embodiments. As described above, the electronic device 101 may select the SIM corresponding to the first application among the SIMs on the basis of the characteristic of the first application and the QoS table of Table 3. When the automatic SIM selection function is not configured (1203—no), the electronic device 101 may select a SIM configured for data transmission and reception in operation 1207. In operation 1209, the electronic device 101 may transmit a PDU session establishment request message for the first application.

Figure 14:
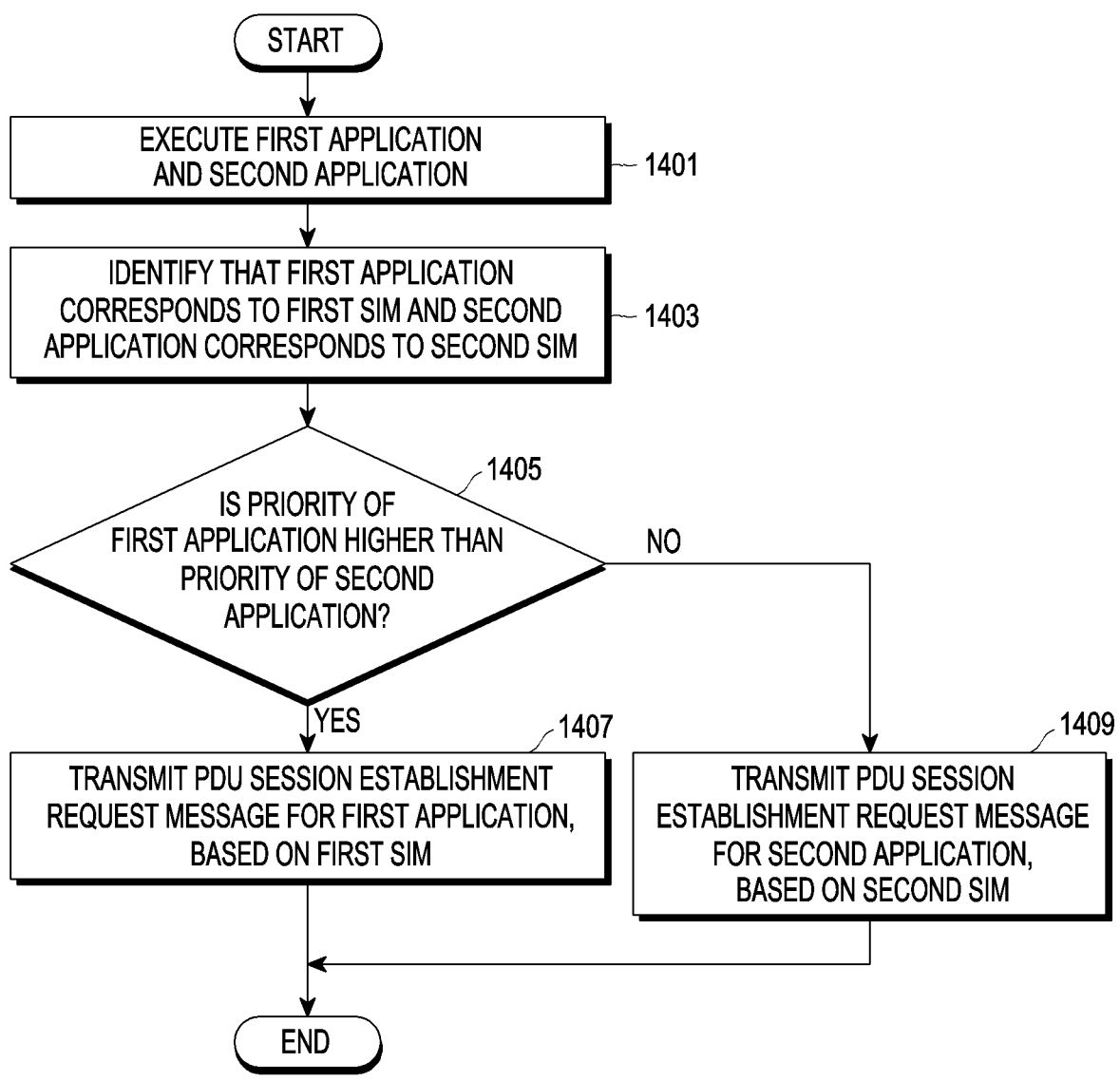
FIG. 14 is a flowchart illustrating a method of operating the electronic device according to an embodiment of the disclosure.

FIG. 14 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may execute a first application and a second application in operation 1401. There is no limitation in the execution sequence of the first application and the second application, and may be at least simultaneously executed. In operation 1403, the electronic device 101 may identify that the first application corresponds to the first SIM 111 and the second application corresponds to the second SIM 112. For example, it is assumed that the network slice type corresponding to the first application is URLLC and the network slice type corresponding to the second application is eMBB. Further, it is assumed that, for example, the packet delay budget of 5QI in QoS flow-related information corresponding to the first SIM 111 is lower than the packet delay budget of 5QI in QoS flow-related information corresponding to the second SIM 112. In this case, the electronic device 101 may select the first SIM 111 having the lower packet delay budget for the first application corresponding to the network slice type of URLLC. Further, it is assumed that, for example, the AMBR in QoS flow-related information corresponding to the first SIM 111 is lower than the AMBR in QoS flow-related information corresponding to the second SIM 112. In this case, the electronic device 101 may select the second SIM 112 having the lower packet delay budget for the second application corresponding to the network slice type of eMBB. Since the SIM corresponding to the first application is different from the SIM corresponding to the second application, the electronic device 101 should select one of the two SIMs.

According to various embodiments, the electronic device 101 may determine whether a priority of the first application is higher than a priority of the second application in operation 1405. When the priority of the first application is higher than the priority of the second application (1405—yes), the electronic device 101 may transmit a PDU session establishment request message for the first application on the basis of the first SIM 111 in operation 1407. Although not illustrated, the electronic device 101 may also transmit a PUD session establishment request message for the second application on the basis of the first SIM 111. When the priority of the first application is lower than the priority of the second application (1405—no), the electronic device 101 may transmit a PDU session establishment request message for the second application on the basis of the second SIM 112 in operation 1409. Although not illustrated, the electronic device 101 may also transmit a PUD session establishment request message for the first application on the basis of the second SIM 112.

In one example, the electronic device 101 may determine the priority for each application according to a configuration by the user. In another example, the electronic device 101 may allocate a relatively higher priority to a relatively frequently used application on the basis of the frequency for each application. Meanwhile, the examples are only examples and there is no limitation in a scheme of configuring the priority.

Figure 15:
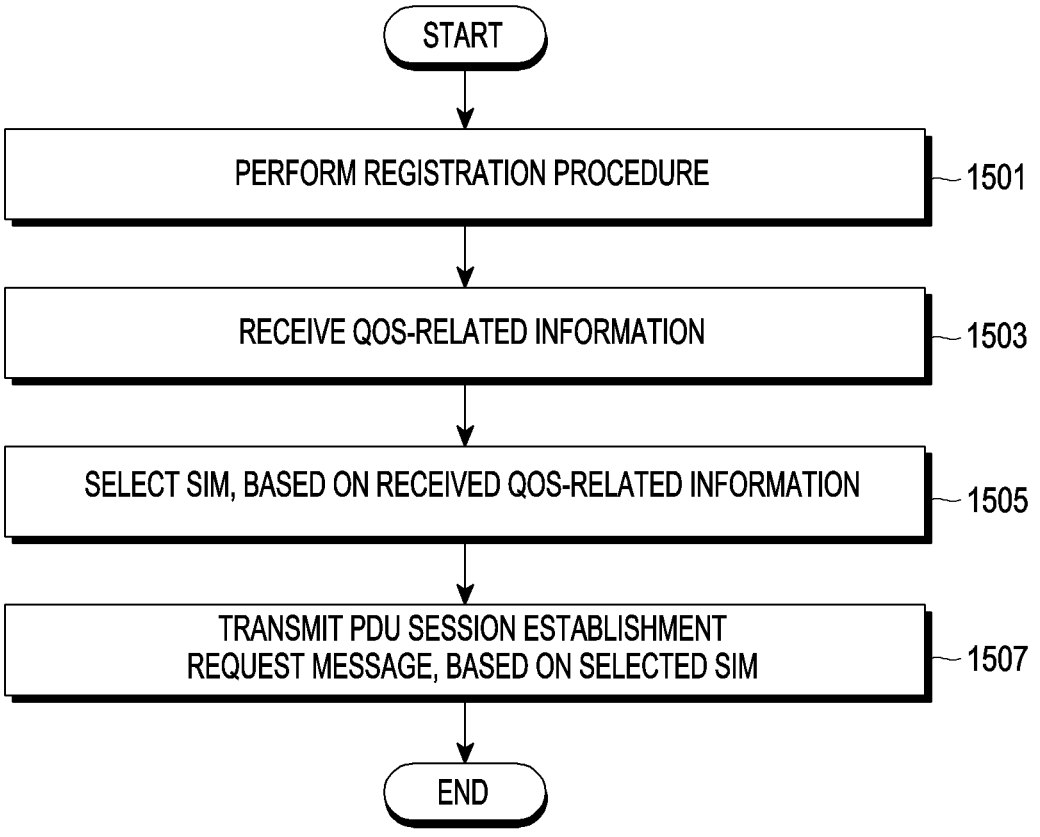
FIG. 15 is a flowchart illustrating a method of operating the electronic device according to an embodiment of the disclosure.

FIG. 15 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may perform a registration procedure in operation 1501. After the registration procedure, the electronic device 101 may receive QoS-related information from a network or a QoS management server in operation 1503. For example, the electronic device 101 may receive the QoS table of Table 3 from the network or the QoS management server. Since there is no history of establishment of a PDU session at a time point at which the electronic device 101 is initially booted or moves to a new roaming region, information for selecting the SIM may not be stored. Even in this case, the electronic device 101 may receive QoS-related information from the network or the QoS management server and select a SIM for a specific application on the basis thereof. In operation 1505, the electronic device 101 may select the SIM on the basis of the received QoS-related information. In operation 1507, the electronic device 101 may transmit a PDU Session establishment request message on the basis of the selected SIM. The electronic device 101 may receive a PDU session accept message corresponding to the PDU session establishment request message. The electronic device 101 may update the received QoS-related information by using the QoS information included in the PDU session accept message.

Figure 16:
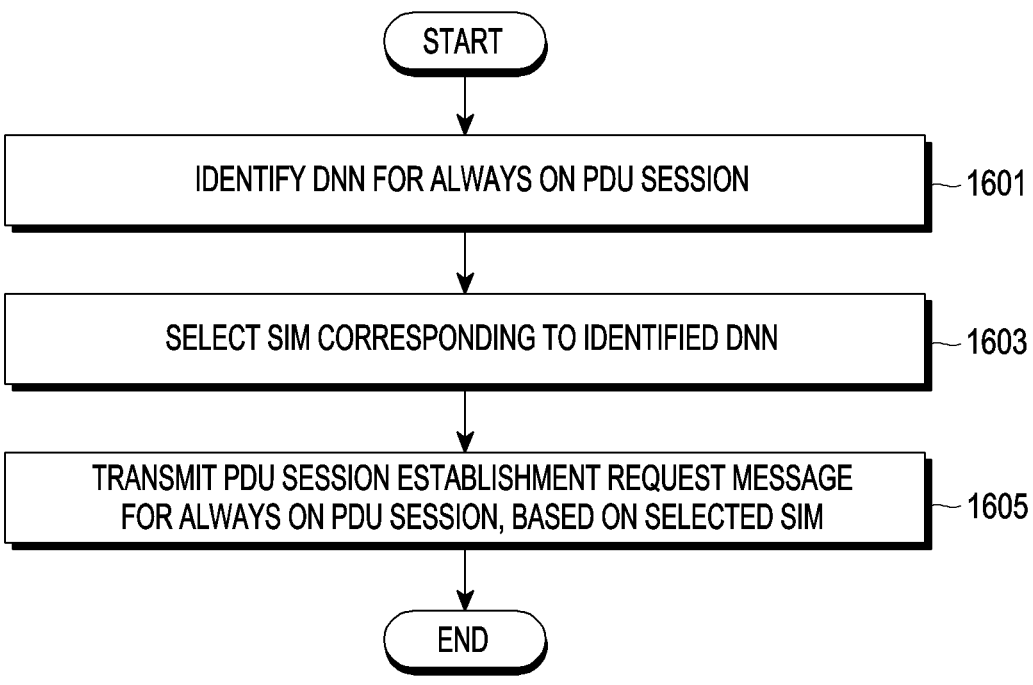
FIG. 16 is a flowchart illustrating a method of operating the electronic device according to an embodiment of the disclosure.

FIG. 16 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may identify a DNN for an always on PDU session (always on PDU session) in operation 1601. Similar to the always on PDN connection in LTE, the electronic device 101 may be configured to establish the always on PDU session according to implementation (or according to a demand of a network operator). In operation 1603, the electronic device 101 may select a SIM corresponding to the identified DNN. For example, the electronic device 101 may select a SIM having a larger AMBR in accordance with the corresponding DNN on the basis of the QoS table of Table 3 but there is no limitation in the type of an item to be compared, for selecting the always on PDU session. The electronic device 101 may transmit a PDU session establishment request message for the always on PDU session on the on the basis of the selected SIM in operation 1605. The electronic device 101 may establish the always on PDU session and, when the specific application is executed thereafter, may associate the corresponding application with the always on PDU session. According to the operation of the always on PDU session, rapid data transmission and reception may be possible, and data may be transmitted and received on the basis of a SIM which can provide the best QoS.

According to various embodiments, the electronic device 101 may manage a DNN corresponding to a default APN used in LTE. The electronic device 101 may the corresponding DNN as a DNN of the always on PDU session. For example, the DNN for the always on PDU session may exist for each SIM stack. For example, the electronic device 101 may compare QoS-related information associated with the first SIM 111 with QoS-related information associated with the second SIM 112, and select a SIM (or a DNN) for the always on PDU session on the basis of the comparison result. The electronic device 101 may allocate the use of the RF device to the selected SIM and establish the always on PDU session on the basis thereof.

Figure 17:
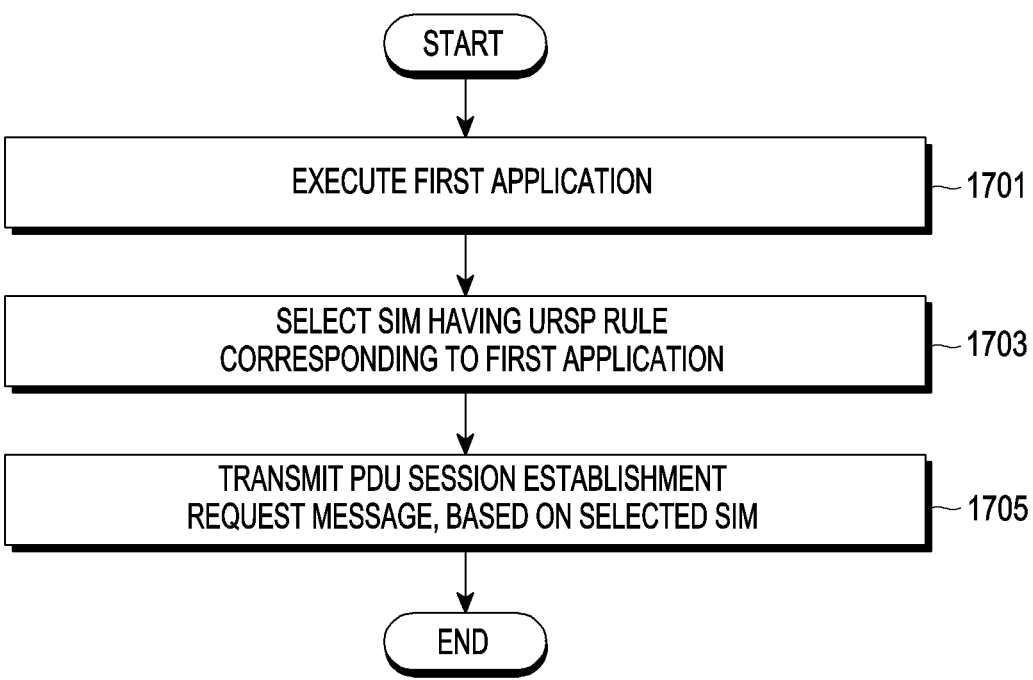
FIG. 17 is a flowchart illustrating a method of operating the electronic device according to an embodiment of the disclosure.

FIG. 17 is a flowchart illustrating a method of operating an electronic device according to an embodiment of the disclosure.

According to various embodiments, the electronic device 101 (for example, at least one of the processor 120 of FIG. 1, the first communication processor 212 of FIG. 2A, the second communication processor 214 of FIG. 2A, or the integrated communication processor 260 of FIG. 2B) may execute a first application in operation 1701. In operation 1703, the electronic device 101 may select a SIM having a URSP rule corresponding to the first application. For example, when a URSP rule associated with the first application is stored for the first SIM 111 but a URSP rule associated with the first application is not stored for the second SIM 112, the electronic device 101 may select the first SIM 111. In operation 1705, the electronic device 101 may transmit a PDU Session establishment request message on the basis of the selected SIM.

According to various embodiments, an electronic device (for example, the electronic device 101) may include at least one processor (for example, at least one of the processor 120, the first communication processor 212, the second communication processor 214, or the integrated communication processor 260), and a memory (for example, the memory 130 and/or a memory within the at least one processor), and the at least one processor may be configured to control to store, in the memory, first information associated with a first QoS flow corresponding to a first SIM (for example, the first SIM 111) connected to the at least one processor, control to store, in the memory, second information associated with a second QoS flow corresponding to a second SIM (for example, the second SIM 112) connected to the at least one processor, identify a characteristic of an application executed by the electronic device, compare at least a portion of the first information and at least a portion of the second information, at least the portion of the first information and at least the portion of the second information being identified, based on the characteristic of the application, select a SIM for transmitting and/or receiving data of the application from among the first SIM and the second SIM, based on a result of the comparison, and transmit a PDU session establishment request message for the application, based on the selected SIM.

According to various embodiments, the at least one processor may be configured to, as at least a portion of the operation of comparing at least the portion of the first information and at least the portion of the second information, at least the portion of the first information and at least the portion of the second information being identified, based on the characteristic of the application, determine an item to be compared among a plurality of items of the first information and the second information, based on the characteristic of the application, and compare a first value corresponding to the item to be compared in the first information and a second value corresponding to the item to be compared in the second information.

According to various embodiments, the at least one processor may be configured to, as at least a portion of the operation of transmitting the PDU session establishment request message for the application, based on the selected SIM, transmit the PDU session establishment request message generated based on the application and a URSP rule associated with the selected SIM.

According to various embodiments, the at least one processor may be configured to, identify that a network slice type corresponding to the application is URLLC, as at least a portion of the operation of identifying the characteristic of the application executed by the electronic device, and compare a third value associated with latency included in the first information and a fourth value associated with latency included in the second information, as at least a portion of the comparing of at least the portion of the first information and at least the portion of the second information, at least the portion of the first information and at least the portion of the second information being identified, based on the characteristic of the application.

According to various embodiments, the at least one processor may be configured to, as at least a portion of the operation of selecting the SIM for transmitting and receiving the data of the application from among the first SIM and the second SIM, based on a result of the comparison, select a SIM corresponding to a value indicating lower latency among the third value and the fourth value.

According to various embodiments, the at least one processor may be configured to, identify that a network slice type corresponding to the application is eMBB, as at least a portion of the operation of identifying the characteristic of the application executed by the electronic device, and compare a fifth value associated with a bandwidth included in the first information and a sixth value associated with a bandwidth included in the second information as at least a portion of the comparing of at least the portion of the first information and at least the portion of the second information, at least the portion of the first information and at least the portion of the second information being identified, based on the characteristic of the application.

According to various embodiments, the at least one processor may be configured to, as at least a portion of the operation of selecting the SIM for transmitting and/or receiving the data of the application from among the first SIM and the second SIM, based on a result of the comparison, select a SIM corresponding to a value indicating a larger bandwidth among the fifth value and the sixth value.

According to various embodiments, the at least one processor may be configured to, as at least a portion of the operation of selecting the SIM for transmitting and/or receiving the data of the application from among the first SIM and the second SIM, select the second SIM as the SIM for transmitting and/or receiving the data of the application in a state in which data of an application different from the application is transmitted and/or received, based on the first SIM.

According to various embodiments, the at least one processor may be configured to, as at least a portion of the operation of transmitting the PDU session establishment request message for the application, based on the selected SIM, allocate an RF device of the electronic device to the second SIM, based on switching to the second SIM from the first SIM being allowed, and transmit the PDU session establishment request message for the application, based on the second SIM.

According to various embodiments, the at least one processor may be configured to, as at least a portion of the operation of transmitting the PDU session establishment request message for the application, based on the selected SIM, allocate an RF device of the electronic device to the second SIM and transmit the PDU session establishment request message for the application, based on the second SIM, and may be further configured to transmit, based on the second SIM, an establishment request message for establishing a PDU session corresponding to at least one existing PDU session pre-established, based on the first SIM.

According to various embodiments, the at least one processor may be configured to, as at least a portion of the operation of selecting the second SIM as the SIM for transmitting and/or receiving the data of the application in the state in which the data of the application different from the application is transmitted and/or received, based on the first SIM, select the second SIM as the SIM for transmitting and/or receiving the data of the application, based on a priority of the application higher than a priority of the different application.

According to various embodiments, the at least one processor may be further configured to receive at least the portion of the first information and/or at least the portion of the second information from a network and/or a server managing information associated with a QoS flow and store the received information in the memory.

According to various embodiments, the at least one processor may be further configured to acquire at least the portion of the first information and/or at least the portion of the second information, based on each of at least one PDU session pre-established based on the first SIM and/or the second SIM and store the acquired information in the memory.

According to various embodiments, a method of operating an electronic device may include an operation of controlling to store, in a memory of the electronic device, first information associated with a first QoS flow corresponding to a first SIM connected to the electronic device, an operation of controlling to store, in the memory, second information associated with a second QoS flow corresponding to a second SIM connected to the electronic device, an operation of identifying a characteristic of an application executed by the electronic device, an operation of comparing at least a portion of the first information and at least a portion of the second information, at least the portion of the first information and at least the portion of the second information being identified, based on the characteristic of the application, an operation of selecting a SIM for transmitting and/or receiving data of the application from among the first SIM and the second SIM, based on a result of the comparison, and an operation of transmitting a PDU session establishment request message for the application, based on the selected SIM.

According to various embodiments, the operation of comparing at least the portion of the first information and at least the portion of the second information, at least the portion of the first information and at least the portion of the second information being identified, based on the characteristic of the application, may include an operation of determining an item to be compared among a plurality of items of the first information and the second information, based on the characteristic of the application and an operation of comparing a first value corresponding to the item to be compared in the first information and a second value corresponding to the item to be compared in the second information.

According to various embodiments, the operation of transmitting the PDU session establishment request message for the application, based on the selected SIM may transmit the PDU session establishment request message generated based on the application and a URSP rule associated with the selected SIM.

According to various embodiments, the operation of selecting the SIM for transmitting and/or receiving the data of the application from among the first SIM and the second DIM may select the second SIM as the SIM for transmitting and/or receiving the data of the application in a state in which data of an application different from the application is transmitted and/or received, based on the first SIM.

According to various embodiments, the operation of transmitting the PDU session establishment request message for the application, based on the selected SIM may further include an operation of allocating an RF device of the electronic device to the second SIM, based on switching to the second SIM from the first SIM being allowed, and transmitting the PDU session establishment request message for the application, based on the second SIM, and the method of operation the electronic device may further include an operation of transmitting, based on the second SIM, an establishment request message for establishing a PDU session corresponding to at least one existing PDU session pre-established, based on the first SIM.

According to various embodiments, the operation of selecting the second SIM as the SIM for transmitting and/or receiving the data of the application in the state in which the data of the application different from the application is transmitted and/or received, based on the first SIM may select the second SIM as the SIM for transmitting and/or receiving the data of the application, based on a priority of the application higher than a priority of the different application.

According to various embodiments, the method of operating the electronic device may further include an operation of acquiring at least the portion of the first information and at least the portion of the second information, based on each of at least one PDU session pre-established based on the first SIM and/or the second SIM and storing the acquired information in the memory of the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

memory, comprising one or more storage media, storing instructions; and one or more processors coupled to the memory, wherein the instructions, when executed by the one or more processors individually or collectively, cause the electronic device to:

control to identify first information associated with a first quality of service (QoS) flow corresponding to a first subscriber identity module (SIM) connected to the one or more processors, control to identify second information associated with a second QoS flow corresponding to a second SIM connected to the one or more processors, identify a network characteristic of an application executed by the electronic device, based on the network characteristic of the application, compare a portion of the first information and a portion of the second information, wherein the portion of the first information and the portion of the second information are identified based on the network characteristic of the application, based on a result of the comparing, select an SIM for transmitting or receiving data of the application from among the first SIM and the second SIM, and based on the SIM selected as the result of the comparing, transmit a protocol data unit (PDU) session establishment request message for the application.

2. The electronic device of claim 1, wherein the instructions, when executed by the one or more processors individually or collectively, further cause the electronic device to:

as at least part of the comparing of the portion of the first information and the portion of the second information:

determine an item to be compared among a plurality of items of the first information and the second information based on the network characteristic of the application; and compare a first value corresponding to the item to be compared in the first information and a second value corresponding to the item to be compared in the second information.

3. The electronic device of claim 1, wherein the instructions, when executed by the one or more processors individually or collectively, further cause the electronic device to:

as at least part of the transmitting of the PDU session establishment request message for the application, based on the SIM selected based on the result of the comparing, transmit the PDU session establishment request message generated based on the application and a user equipment (UE) route selection policy (URSP) rule associated with the SIM selected based on the result of the comparing.

4. The electronic device of claim 1, wherein the instructions, when executed by the one or more processors individually or collectively, further cause the electronic device to:

as at least part of the identifying of the network characteristic of the application executed by the electronic device:

identify that a network slice type corresponding to the application is ultra-reliable and low-latency communications (URLLC); and compare a third value associated with latency included in the first information and a fourth value associated with latency included in the second information as at least part of the comparing of the portion of the first information and the portion of the second information, and wherein the portion of the first information and the portion of the second information are identified based on the network characteristic of the application.

5. The electronic device of claim 4, wherein the instructions, when executed by the one or more processors individually or collectively, further cause the electronic device to:

as at least part of the selecting of the SIM for transmitting or receiving the data of the application from among the first SIM and the second SIM, based on the result of the comparing, select the SIM corresponding to a value indicating lower latency among the third value and the fourth value.

6. The electronic device of claim 1, wherein the instructions, when executed by the one or more processors individually or collectively, further cause the electronic device to:

as at least part of the identifying of the network characteristic of the application executed by the electronic device:

identify that a network slice type corresponding to the application is enhanced mobile broadband (eMBB); and compare a fifth value associated with a bandwidth included in the first information and a sixth value associated with a bandwidth included in the second information as at least part of the comparing of the portion of the first information and the portion of the second information, and wherein the portion of the first information and the portion of the second information are identified based on the network characteristic of the application.

7. The electronic device of claim 6, wherein the instructions, when executed by the one or more processors individually or collectively, further cause the electronic device to:

as at least part of the selecting of the SIM for transmitting or receiving the data of the application from among the first SIM and the second SIM, based on the result of the comparing, select the SIM corresponding to a value indicating a larger bandwidth among the fifth value and the sixth value.

8. The electronic device of claim 1, wherein the instructions, when executed by the one or more processors individually or collectively, further cause the electronic device to:

as at least part of the selecting of the SIM for transmitting or receiving the data of the application from among the first SIM and the second SIM, select the second SIM as the SIM for transmitting or receiving the data of the application in a state in which data of an application different from the application is transmitted or received, based on the first SIM.

9. The electronic device of claim 8, wherein the instructions, when executed by the one or more processors individually or collectively, further cause the electronic device to:

as at least part of the transmitting of the PDU session establishment request message for the application, based on the SIM selected based on the result of the comparing:

allocate a radio frequency (RF) device of the electronic device to the second SIM, based on switching to the second SIM from the first SIM being allowed; and transmit the PDU session establishment request message for the application, based on the second SIM.

10. The electronic device of claim 8, wherein the instructions, when executed by the one or more processors individually or collectively, further cause the electronic device to:

as at least part of the transmitting of the PDU session establishment request message for the application, based on the SIM selected based on the result of the comparing, allocate a radio frequency (RF) device of the electronic device to the second SIM;

transmit the PDU session establishment request message for the application, based on the second SIM; and transmit, based on the second SIM, an establishment request message for establishing a PDU session corresponding to at least one existing PDU session pre-established, based on the first SIM.

11. The electronic device of claim 8, wherein the instructions, when executed by the one or more processors individually or collectively, further cause the electronic device to:

as at least part of the selecting of the second SIM as the SIM for transmitting or receiving the data of the application in the state in which the data of the application different from the application is transmitted or received, based on the first SIM, select the second SIM as the SIM for transmitting or receiving the data of the application, based on a priority of the application higher than a priority of the different application.

12. The electronic device of claim 1, instructions, when executed by the one or more processors individually or collectively, further cause the electronic device to:

receive the portion of the first information or the portion of the second information from a network or a server managing information associated with a QoS flow; and store the received information in the memory.

13. The electronic device of claim 1, wherein the instructions, when executed by the one or more processors individually or collectively, further cause the electronic device to:

acquire the portion of the first information or at least the portion of the second information, based on each of at least one PDU session pre-established based on the first SIM or the second SIM; and store the acquired information in the memory.

14. The electronic device of claim 1, wherein the network characteristic includes at least one of a data network name (DNN) or a network slice type.

15. A method performed by an electronic device, the method comprising:

identifying, by the electronic device in memory of the electronic device, first information associated with a first quality of service (QoS) flow corresponding to a first subscriber identity module (SIM) connected to the electronic device;

identifying, by the electronic device in the memory, second information associated with a second QoS flow corresponding to a second SIM connected to the electronic device;

identifying, by the electronic device, a network characteristic of an application executed by the electronic device;

based on the network characteristic of the application, comparing, by the electronic device, a portion of the first information and a portion of the second information, wherein the portion of the first information and the portion of the second information are identified based on the network characteristic of the application;

based on a result of the comparing, selecting, by the electronic device, an SIM for transmitting or receiving data of the application from among the first SIM and the second SIM; and based on the SIM selected as the result of the comparing, transmitting, by the electronic device, a protocol data unit (PDU) session establishment request message for the application.

16. The method of claim 15, wherein the comparing of the portion of the first information and the portion of the second information, comprises:

determining an item to be compared among a plurality of items of the first information and the second information, based on the network characteristic of the application, and comparing a first value corresponding to the item to be compared in the first information and a second value corresponding to the item to be compared in the second information.

17. The method of claim 15, wherein the transmitting of the PDU session establishment request message for the application, based on the SIM selected based on the result of the comparing, comprises:

transmitting the PDU session establishment request message generated based on the application and a user equipment (UE) route selection policy (URSP) rule associated with the SIM selected based on the result of the comparing.

18. The method of claim 15, wherein the identifying of the network characteristic of the application executed by the electronic device includes identifying that a network slice type corresponding to the application is ultra-reliable and low-latency communications (URLLC), and wherein the comparing of the portion of the first information and the portion of the second information includes comparing a third value associated with latency included in the first information and a fourth value associated with latency included in the second information.

19. The method of claim 18, wherein the selecting of the SIM for transmitting or receiving the data of the application from among the first SIM and the second SIM, based on a result of the comparing comprises:

selecting the SIM corresponding to a value indicating lower latency among the third value and the fourth value.

20. The method of claim 15, wherein the identifying of the network characteristic of the application executed by the electronic device includes identifying that a network slice type corresponding to the application is enhanced mobile broadband (eMBB), and wherein the comparing of the portion of the first information and the portion of the second information includes comparing a fifth value associated with a bandwidth included in the first information and a sixth value associated with a bandwidth included in the second information.

21. The method of claim 20, wherein the selecting of the SIM for transmitting or receiving the data of the application from among the first SIM and the second SIM, based on a result of the comparing, comprises:

selecting the SIM corresponding to a value indicating a larger bandwidth among the fifth value and the sixth value.

22. The method of claim 15, wherein the network characteristic includes at least one of a data network name (DNN) or a network slice type.

* * * * *